(12) United States Patent
Viselli et al.

(10) Patent No.: US 10,215,161 B2
(45) Date of Patent: Feb. 26, 2019

(54) METHOD OF CONSTRUCTION, ASSEMBLY, AND LAUNCH OF A FLOATING WIND TURBINE PLATFORM

(71) Applicant: University of Maine System Board of Trustees, Bangor, ME (US)

(72) Inventors: Anthony M. Viselli, Bangor, ME (US); Habib J. Dagher, Bangor, ME (US)

(73) Assignee: University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 15/550,390

(22) PCT Filed: Feb. 24, 2016

(86) PCT No.: PCT/US2016/019284
§ 371 (c)(1),
(2) Date: Aug. 11, 2017

(87) PCT Pub. No.: WO2016/138088
PCT Pub. Date: Sep. 1, 2016

(65) Prior Publication Data
US 2018/0030963 A1 Feb. 1, 2018

Related U.S. Application Data

(60) Provisional application No. 62/149,947, filed on Apr. 20, 2015, provisional application No. 62/120,081, filed on Feb. 24, 2015.

(51) Int. Cl.
*F03D 9/00* (2016.01)
*H02P 9/04* (2006.01)
(Continued)

(52) U.S. Cl.
CPC .............. *F03D 13/25* (2016.05); *B63B 1/107* (2013.01); *B63B 5/20* (2013.01); *B63B 21/50* (2013.01);
(Continued)

(58) Field of Classification Search
CPC ...... B63B 1/107; B63B 5/20; B63B 21/50; B63B 35/03
(Continued)

(56) References Cited

U.S. PATENT DOCUMENTS 4,015,554 A * 4/1977 Chow ..................... B63B 9/065
114/125
4,318,362 A * 3/1982 Jung ........................ B63B 5/20
114/263
(Continued)

FOREIGN PATENT DOCUMENTS

WO 2004087494 A2 10/2004
WO 2009036107 A2 3/2009
(Continued)

OTHER PUBLICATIONS

European Search Report, Application No. 16756247.9, dated Sep. 24, 2018.

*Primary Examiner* — Tulsidas C Patel
*Assistant Examiner* — Thomas K Quigley
(74) *Attorney, Agent, or Firm* — MacMillan, Sobanski & Todd, LLC

(57) ABSTRACT

A method of constructing and assembling a floating wind turbine platform includes constructing pre-stressed concrete sections of a floating wind turbine platform base, assembling the floating wind turbine platform base sections to form the base at a first location in a floating wind turbine platform assembly area, and moving the base to a second location in the floating wind turbine platform assembly area. Pre-
(Continued)

stressed concrete sections of floating wind turbine platform columns are constructed, and the column sections are assembled to form a center column and a plurality of outer columns on the base to define a hull at the second location in the floating wind turbine platform assembly area. The hull is then moved to a third location in the floating wind turbine platform assembly area. Secondary structures are mounted on and within the hull, and the hull is moved to a fourth location in the floating wind turbine platform assembly area. A wind turbine tower is constructed on the center column, and a wind turbine is mounted on the wind turbine tower, thus defining the floating wind turbine platform. The floating wind turbine platform is then moved to a launch platform in a fifth location and launched into a body of water.

22 Claims, 16 Drawing Sheets

(51) Int. Cl.
| | | |
|---|---|---|
| *F03D 13/25* | (2016.01) | |
| *B63B 1/10* | (2006.01) | |
| *B63B 5/20* | (2006.01) | |
| *B63B 21/50* | (2006.01) | |
| *B63B 35/44* | (2006.01) | |
| *B63B 35/00* | (2006.01) | |
| *F03D 13/40* | (2016.01) | |
| *F03D 13/10* | (2016.01) | |
| *B63B 39/03* | (2006.01) | |
| *B63B 1/12* | (2006.01) | |

(52) U.S. Cl.
CPC ............ *B63B 35/003* (2013.01); *B63B 35/44* (2013.01); *B63B 39/03* (2013.01); *F03D 13/10* (2016.05); *F03D 13/40* (2016.05); *B63B 2001/128* (2013.01); *B63B 2021/505* (2013.01); *B63B 2035/446* (2013.01); *F05B 2240/93* (2013.01); *F05B 2240/95* (2013.01); *Y02E 10/727* (2013.01)

(58) Field of Classification Search
USPC ..................................................... 290/44, 55
See application file for complete search history.

(56) References Cited

U.S. PATENT DOCUMENTS

| 4,481,899 A | * | 11/1984 | Einstabland | ............ B63B 35/50 |
| --- | --- | --- | --- | --- |
| | | | | 114/258 |
| 2006/0062676 A1 | * | 3/2006 | Jakubowski | ............ B63B 35/44 |
| | | | | 416/244 R |
| 2011/0155038 A1 | | 6/2011 | Jähnig et al. | |
| 2011/0174206 A1 | * | 7/2011 | Kupersmith | ............ B63B 35/44 |
| | | | | 114/125 |
| 2012/0255478 A1 | | 10/2012 | Hadeler et al. | |
| 2013/0233231 A1 | * | 9/2013 | Dagher | .................. B63B 21/50 |
| | | | | 114/265 |
| 2013/0243559 A1 | | 9/2013 | Springett et al. | |

FOREIGN PATENT DOCUMENTS

| WO | 2013155521 A1 | 10/2013 |
|---|---|---|
| WO | 2014118411 A1 | 8/2014 |
| WO | 2015120227 A1 | 8/2015 |

\* cited by examiner

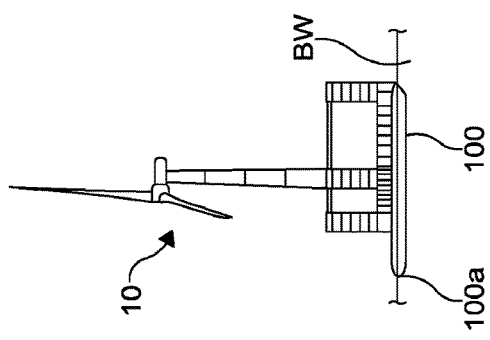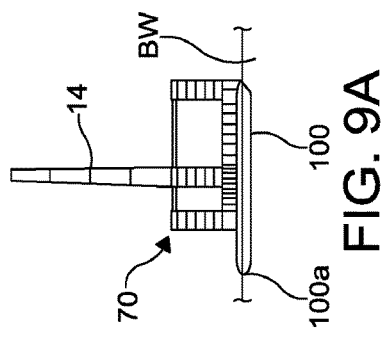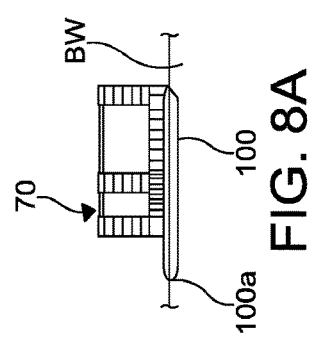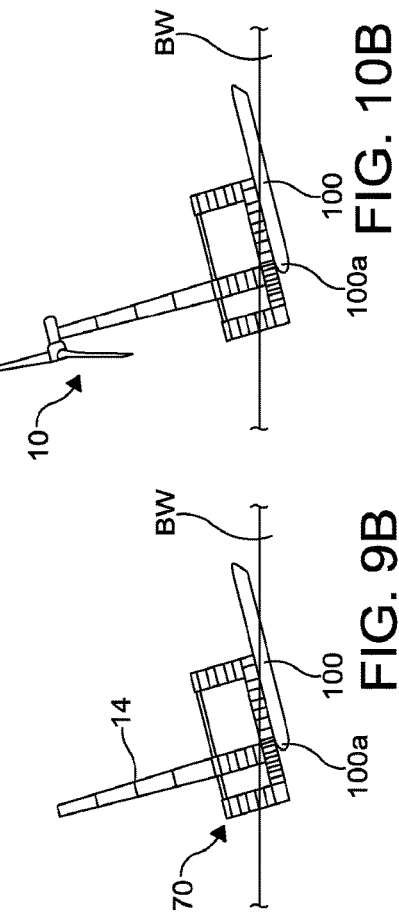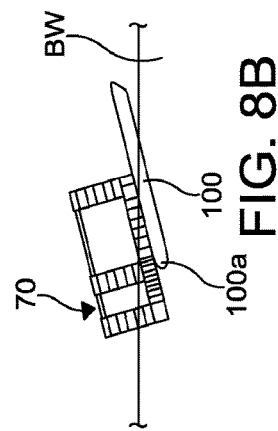

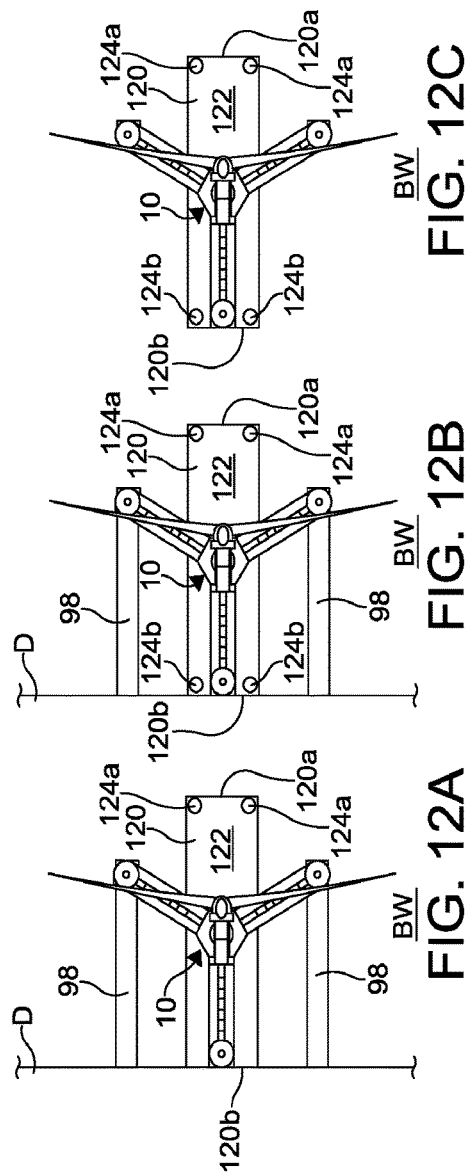
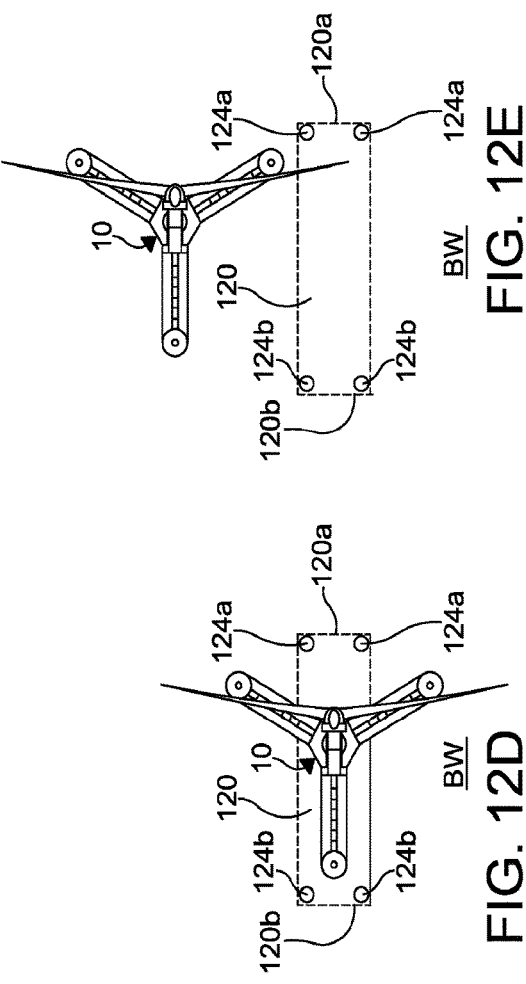

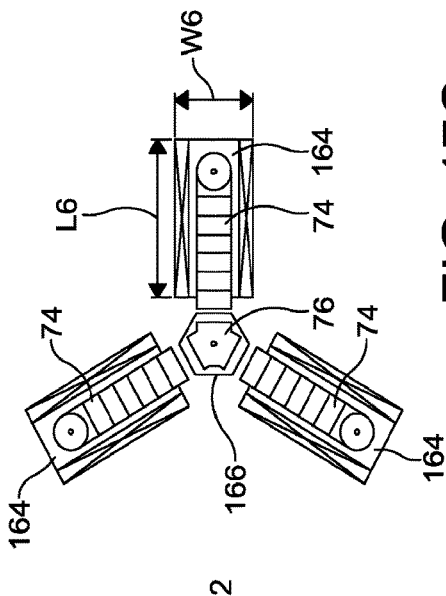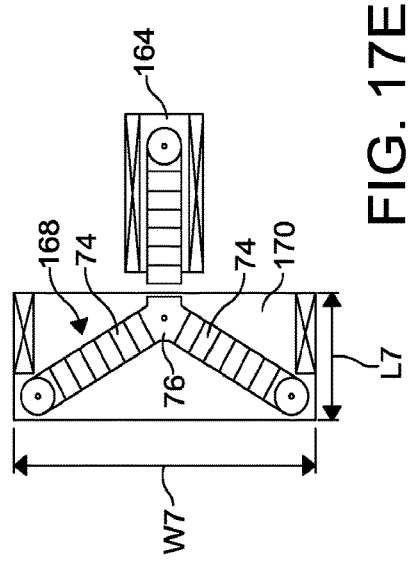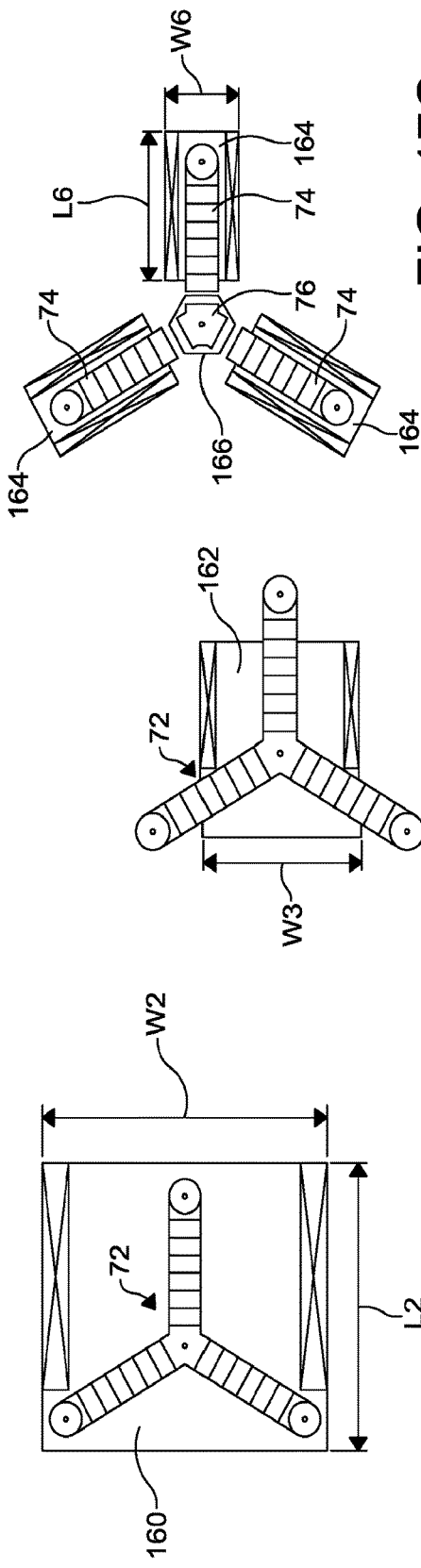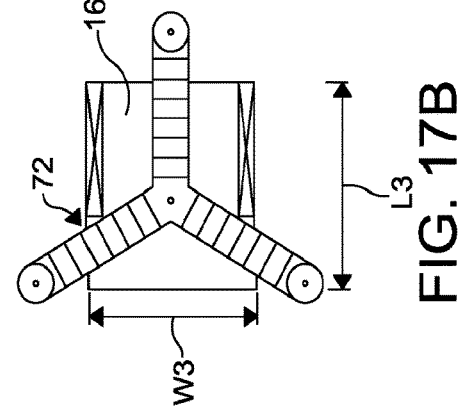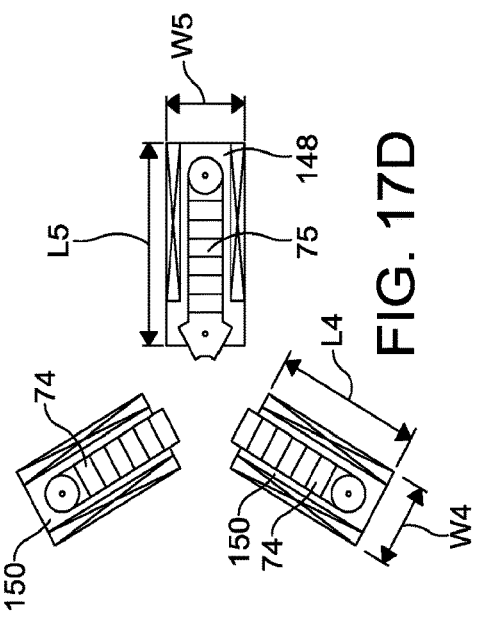

12
METHOD OF CONSTRUCTION, ASSEMBLY, AND LAUNCH OF A FLOATING WIND TURBINE PLATFORM

CROSS-REFERENCE TO RELATED APPLICATIONS

This application claims the benefit of U.S. Provisional Application Nos. 62/120,081, filed Feb. 24, 2015, and 62/149,947, filed Apr. 14, 2015 the disclosures of which are incorporated herein by reference.

BACKGROUND OF THE INVENTION

This invention relates in general to wind turbine platforms. In particular, this invention relates to an improved method of constructing, assembling, and launching a floating wind turbine platform into a body of water.

Wind turbines for converting wind energy to electrical power are known and provide an alternative energy source for power companies. On land, large groups of wind turbines, often numbering in the hundreds of wind turbines, may be placed together in one geographic area. These large groups of wind turbines can generate undesirably high levels of noise and may be viewed as aesthetically unpleasing. An optimum flow of air may not be available to these land-base wind turbines due to obstacles such as hills, woods, and buildings.

Groups of wind turbines may also be located offshore, but near the coast at locations where water depths allow the wind turbines to be fixedly attached to a foundation on the seabed. Over the ocean, the flow of air to the wind turbines is not likely to be disturbed by the presence of various obstacles (i.e., as hills, woods, and buildings) resulting in higher mean wind speeds and more power. The foundations required to attach wind turbines to the seabed at these near-coast locations are relatively expensive, and can only be accomplished at relatively shallow depths, such as a depth of up to about 45 meters.

The U.S. National Renewable Energy Laboratory has determined that winds off the U.S. Coastline over water having depths of 30 meters or greater have an energy capacity of about 3,200 TWh/yr. This is equivalent to about 90 percent of the total U.S. energy use of about 3,500 TWh/yr. The majority of the offshore wind resource resides between 37 and 93 kilometers offshore where the water is over 60 meters deep. Fixed foundations for wind turbines in such deep water are likely not economically feasible. This limitation has led to the development of floating platforms for wind turbines. Known floating wind turbine platforms are formed steel and are based on technology developed by the offshore oil and gas industry. There remains a need in the art however, for improved methods of constructing, assembling, and launching a floating wind turbine platform.

SUMMARY OF THE INVENTION

This invention relates in general to methods of constructing, assembling, and launching floating wind turbine platforms and the wind turbines mounted thereon. In particular, this invention relates to an improved method of constructing, assembling, and launching a floating wind turbine platform wherein at least a portion of the wind turbine platform; e.g., the base, the hull without top beams, the hull with top beams, or the entire floating wind turbine platform with the wind turbine mounted thereon, is constructed and assembled on land. The wind turbine platform, or portion thereof, is then moved to a launch site, such as by a rail system, a jack and slide system, a system of heavy lifting airbags, or a self-propelled modular transport (SPMT) system and then moved onto a launch barge or a launch dock. From the launch barge or the launch dock, the wind turbine platform, or portion thereof, may be then deployed into a body of water.

In one embodiment, the method of constructing and assembling a floating wind turbine platform includes constructing pre-stressed concrete sections of a floating wind turbine platform base, assembling the floating wind turbine platform base sections to form the base at a first location in a floating wind turbine platform assembly area, and moving the base to a second location in the floating wind turbine platform assembly area. Pre-stressed concrete sections of floating wind turbine platform columns are constructed, and the column sections are assembled to form a center column and a plurality of outer columns on the base to define a hull at the second location in the floating wind turbine platform assembly area. The hull is then moved to a third location in the floating wind turbine platform assembly area. Secondary structures are mounted on and within the hull, and the hull is moved to a fourth location in the floating wind turbine platform assembly area. A wind turbine tower is constructed on the center column, and a wind turbine is mounted on the wind turbine tower, thus defining the floating wind turbine platform. The floating wind turbine platform is then moved to a launch platform in a fifth location and launched into a body of water.

Various aspects of this invention will become apparent to those skilled in the art from the following detailed description of the preferred embodiment, when read in light of the accompanying drawings.

BRIEF DESCRIPTION OF THE DRAWINGS

FIG. 8A is an elevational view of a hull shown floating on the launch barge illustrated in FIG. 7.

FIG. 8B is an elevational view of the hull and launch barge illustrated in FIG. 8A showing the stern of the launch barge lowered to launch the hull according to the improved method of this invention.

FIG. 9A is an elevational view of the hull with an attached tower shown floating on the launch barge illustrated in FIG. 7.

FIG. 9B is an elevational view of the hull, the attached tower, and the launch barge illustrated in FIG. 9A showing the stern of the launch barge lowered to launch the hull and the attached tower according to the improved method of this invention.

FIG. 10A is an elevational view of the floating wind turbine platform illustrated in FIG. 1 shown floating on the launch barge illustrated in FIG. 7.

FIG. 10B is an elevational view of the floating wind turbine platform illustrated in FIG. 10A showing the stern of the launch barge lowered to launch the floating wind turbine platform according to the improved method of this invention.

FIGS. 12A through 12E are sequential plan views of a launch method showing the floating wind turbine platform being positioned on, and launched from, a semi-submersible launch barge according to the improved method of this invention.

FIGS. 17A through 17E illustrate alternate embodiments of the launch barge according to the improved method of this invention.

DETAILED DESCRIPTION OF THE PREFERRED EMBODIMENT

The present invention will now be described with occasional reference to the specific embodiments of the invention. This invention may, however, be embodied in different forms and should not be construed as limited to the embodiments set forth herein. Rather, these embodiments are provided so that this disclosure will be thorough and complete, and will fully convey the scope of the invention to those skilled in the art.

Figures 1, 1A:
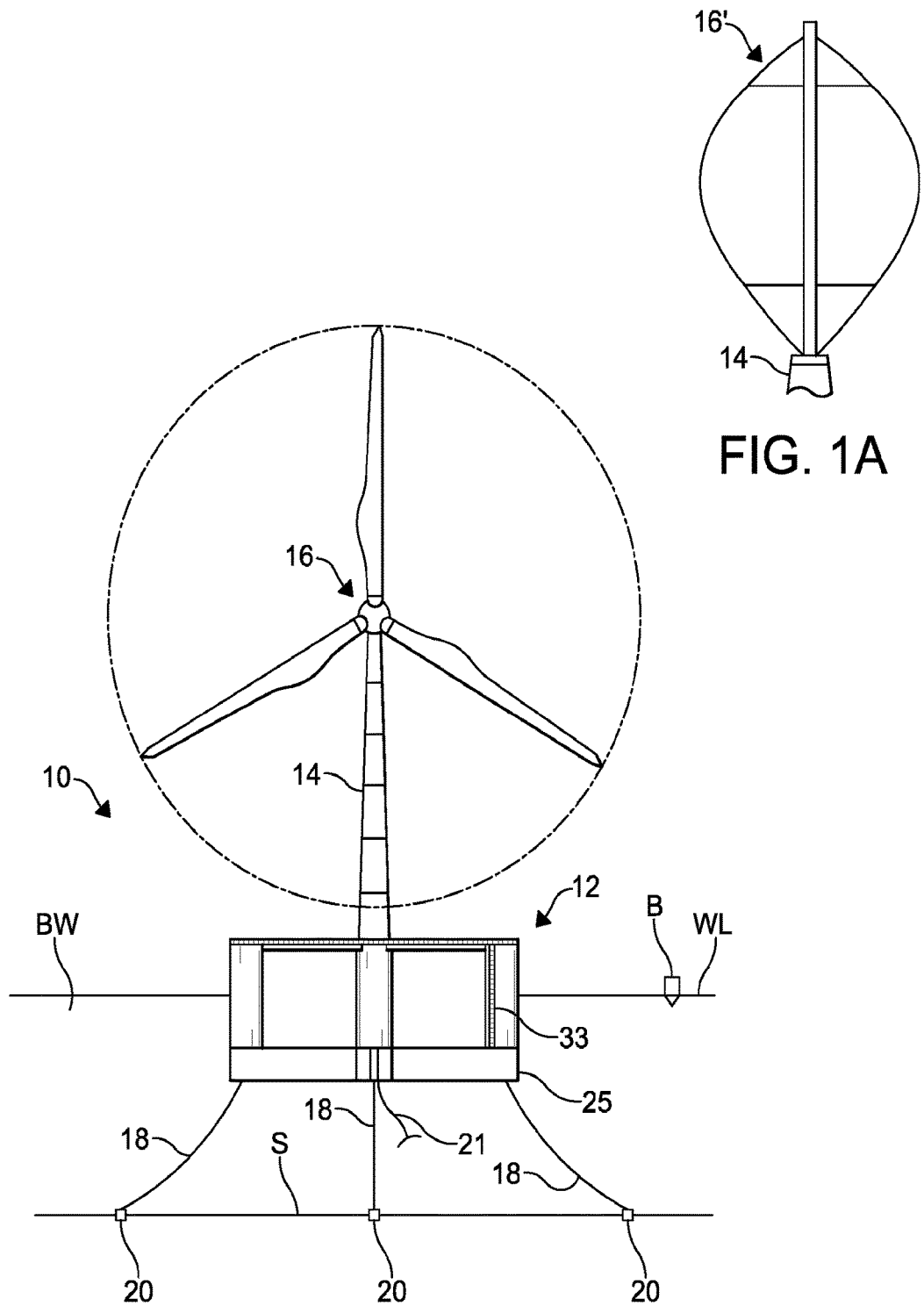
FIG. 1 is an elevational view of a floating wind turbine platform constructed, assembled, and launched according to the improved method of this invention.
FIG. 1A is an enlarged elevational view of portion of an alternate embodiment of the floating wind turbine platform illustrated in FIG. 1 showing a vertical-axis wind turbine.

Referring to the drawings, particularly to FIG. 1, a first embodiment of a floating wind turbine system or platform 10 is shown anchored to a bed of a body of water BW. The floating wind turbine platform is representative of a wind turbine platform that has been constructed and assembled in accordance with the improved method of this invention. In the illustrated embodiment, the floating wind turbine platform 10 is shown anchored to the seabed S. It will be understood that the seabed may be the bed of any body of water in which the floating wind turbine platform 10 will be placed into operation.

The illustrated floating wind turbine platform 10 includes a foundation or hull 12 that supports a tower 14, described below in detail. The tower 14 supports a wind turbine 16. The foundation is semi-submersible, and is structured and configured to float, semi-submerged, in a body of water. Accordingly, a portion of the hull 12 will be above water when the hull 12 is floating in the water. As shown, a portion of the hull 12 is also below the waterline WL. As used herein, the waterline WL is defined as the approximate line where the surface of the water meets the floating wind turbine platform 10. Mooring lines 18 may be attached to the floating wind turbine platform 10 and further attached to anchors, such as the anchors 20 in the seabed S to limit to movement of the floating wind turbine platform 10 on the body of water.

Figure 2:
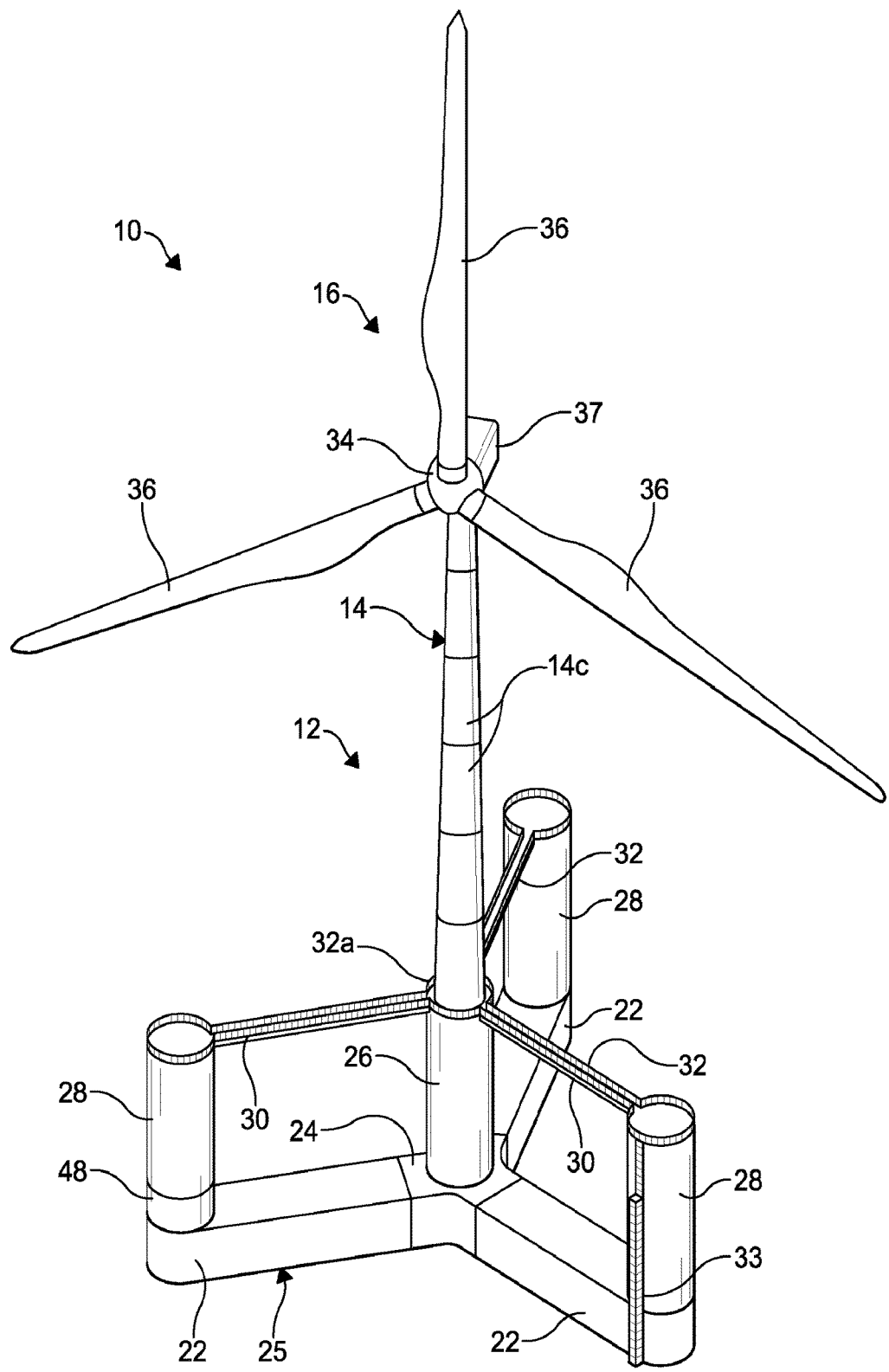
FIG. 2 is a perspective view of the improved floating wind turbine platform illustrated in FIG. 1.

As will be described in greater detail below, and best shown in FIG. 2, the illustrated hull 12 is formed from three bottom beams 22 that extend radially outwardly from a keystone 24 and provide buoyancy. When assembled together, the bottom beams 22 and the keystone 24 define a base 25. An interior or center column 26 is mounted to the keystone 24, and three outer columns 28 are mounted at or near the distal ends of the bottom beams 22. The center column 26 and the outer columns 28 extend outwardly (upwardly when viewing FIGS. 1 and 2) and perpendicularly to the bottom beams 22, and also provide buoyancy. Axes of the center column 26 and the outer columns 28 are also substantially parallel. Additionally, the center column 26 supports the tower 14. Support members or top beams 30 extend radially from, and are connected to, the center column 26, and are also connected to each of the outer columns 28. The tower 14 is mounted to the center column 26.

If desired, access-ways or catwalks 32 may be attached to each top beam 30. Each catwalk 32 may be connected by a connecting catwalk or tower access platform 32a mounted around all or a portion of a base of the tower 14. Access ladders 33 may mounted to one or more of the center column 26 and the outer columns 28.

In the embodiments illustrated herein, the wind turbine 16 is a horizontal-axis wind turbine. Alternatively, the wind turbine may be a vertical-axis wind turbine, such as shown at 16' in FIG. 1A. The size of the wind turbine 16 will vary based on the wind conditions at the location where the floating wind turbine platform 10 is anchored and the desired power output. For example, the wind turbine 16 may have an output of about 5 MW. Alternatively, the wind turbine 16 may have an output within the range of from about 1 MW to about 10 MW.

The wind turbine 16 includes a rotatable hub 34. At least one rotor blade 36 is coupled to and extends outward from the hub 34. The hub 34 is rotatably coupled to an electric generator (not shown). The electric generator may be coupled via a transformer (not shown) and an underwater power cable 21, as shown in FIG. 1, to a power grid (not shown). In the illustrated embodiment, the rotor has three rotor blades 36. In other embodiments, the rotor may have more or less than three rotor blades 36. A nacelle 37 is attached to the wind turbine 16 opposite the hub 34.

Figure 3:
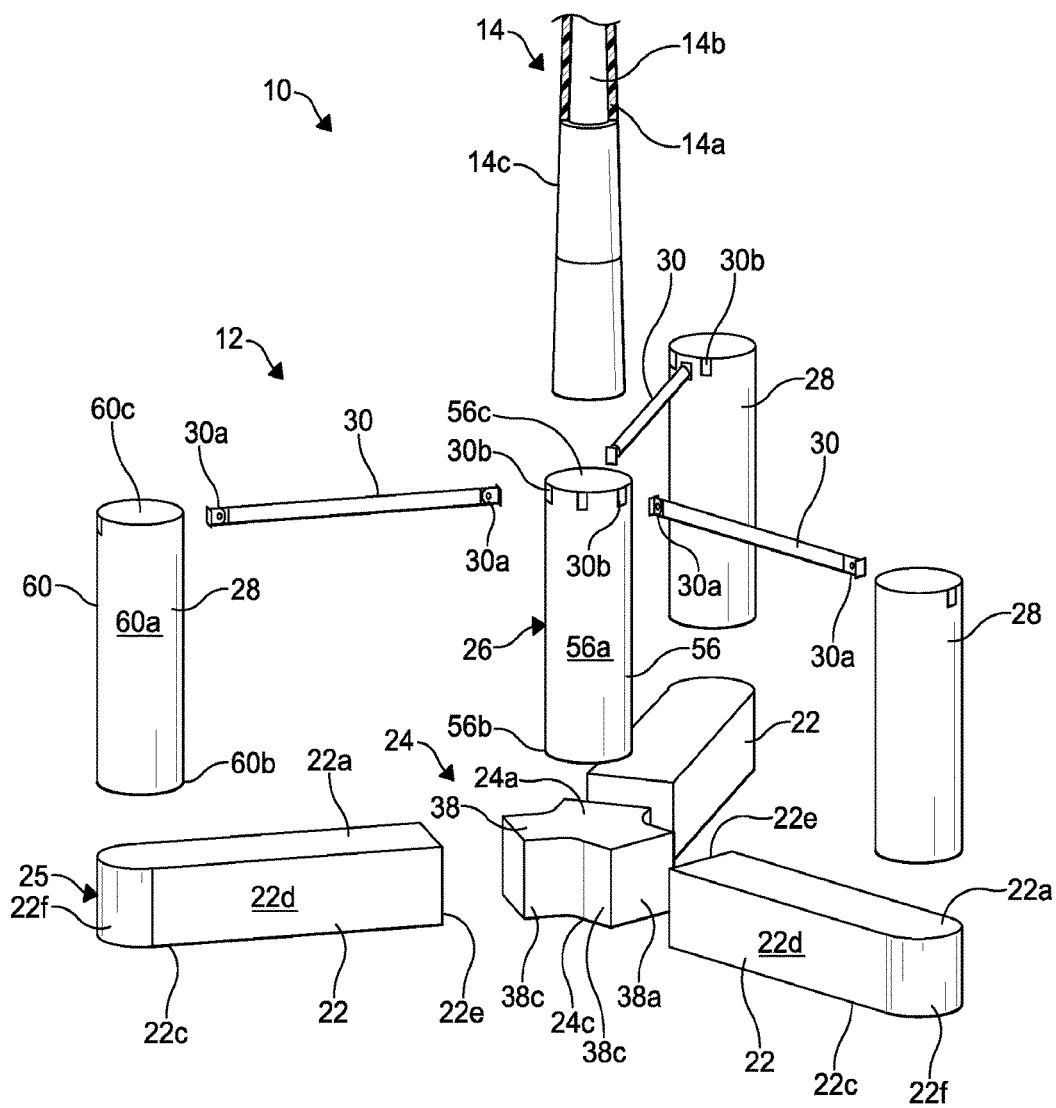
FIG. 3 is an exploded perspective view of the improved floating wind turbine platform illustrated in FIGS. 1 and 2.

As shown in FIG. 3, the keystone 24 includes an upper wall 24a, a lower wall 24c, and three radially outwardly extending legs 38. Each leg 38 includes an end wall 38a defining a substantially vertical connection face to which the bottom beams 22 will be attached, and opposing side walls 38c.

In the illustrated embodiment, the keystone 24 includes three legs 38. Alternatively, the keystone 24 may include four or more legs for the attachment of four or more bottom beams 22.

The illustrated keystone 24 is formed from pre-stressed reinforced concrete, and may include an internal central cavity (not shown). Each leg 38 may also include an internal leg cavity (not shown). Any desired process may be used to manufacture the keystone 24, such as a spun concrete process, with conventional concrete forms, or with reusable concrete forms in a semi-automated process such as used in the precast concrete industry. The concrete of the keystone 24 may be reinforced with any conventional reinforcement material, such as high tensile steel cable and high tensile steel reinforcement bars or REBAR. Alternatively, the keystone 24 may be formed from FRP, steel, or combinations of pre-stressed reinforced concrete, FRP, and steel.

As also shown in FIG. 3, each bottom beam 22 includes an upper wall 22a, a lower wall 22c, opposing side walls 22d, a first end wall 22e, which will be connected to the end wall 38a of the leg 38 of the keystone 24, and a semi-cylindrical second end wall 22f. Like the keystone 24, the illustrated bottom beams 22 are formed from pre-stressed reinforced concrete as described above. Alternatively, the bottom beams 22 may be formed from FRP, steel, or combinations of pre-stressed reinforced concrete, FRP, and steel.

If desired, one or more first ballast chambers (not shown) may be formed in each bottom beam 22. Also, one or more second ballast chambers 48 may be formed in each outer column 28.

Referring again to FIG. 3, the center column 26 includes a cylindrical side wall 56 having an outer surface 56a, a first axial end 56b, a second axial end wall 56c, and defines a hollow interior space (not shown). Similarly, the outer columns 28 include a cylindrical side wall 60 having an outer surface 60a, a first axial end 60b, a second axial end wall 60c, and define a hollow interior space (not shown). Like the keystone 24 and the bottom beams 22, the illustrated center column 26 and the outer columns 28 are formed from pre-stressed reinforced concrete as described above. Alternatively, the center column 26 and the outer columns 28 may be formed from FRP, steel, or combinations of pre-stressed reinforced concrete, FRP, and steel. The center column 26 and the outer columns 28 may be formed in sections, as described in detail below.

The illustrated floating wind turbine platform 10 includes three bottom beams 22 and three outer columns 28. It will be understood however, that the improved floating wind turbine platform 10 may be constructed with four or more bottom beams 22 and outer columns 28.

Referring to FIG. 3, the top beams 30 are configured as substantially axially loaded members and extend substantially horizontally between upper ends of the center column 26 and each outer column 28. In the illustrated embodiment, the top beams 30 are formed of tubular steel having an outside diameter of about 4 ft (1.2 m). Alternatively, the top beams 30 may be formed from FRP, pre-stressed reinforced concrete, or combinations of pre-stressed reinforced concrete, FRP, and steel. Each top beam 30 includes mounting brackets 30a at each end. The mounting brackets 30a are configured to be attached, such as by threaded fasteners, to attachment members 30b, such as steel plates, on the center column 26 and each outer column 28.

The top beams 30 are further designed and configured substantially not to resist the bending moment of the base of the tower 14, and do not carry a bending load. Rather, the top beams 30 receive and apply tensile and compressive forces between the center column 26 and the outer columns 28.

The illustrated top beams 30 are formed from steel having a diameter of about 3 ft to about 4 ft and are lighter and thinner than similar beams formed from reinforced concrete. The use of relatively lighter and thinner top beams 30; i.e., axially loaded members, at the upper portion of the floating wind turbine platform 10 allows for the distribution of more relative weight at the bottom of the floating wind turbine platform 10 platform structure where it is needed most. The reduction in weight can be significant. For example, a concrete member weighing about 800,000 pounds may be replaced with a steel beam weighing about 70,000 pounds, thus also providing advantageous savings in material and construction cost.

In the illustrated embodiment, the tower 14 is tubular having an outer wall 14a defining a hollow interior space 14b, and may have any suitable outside diameter and height. In the illustrated embodiment, the outside diameter of the tower 14 tapers from a first diameter at its base to a second, smaller diameter at its upper end. The illustrated tower 14 is formed from fiber reinforced polymer (FRP) composite material. Non-limiting examples of other suitable composite materials include glass and carbon FRP. The tower may also be formed from a composite laminate material. Alternatively, the tower 14 may be formed from concrete or steel in the same manner as the components of the hull 12, described in detail above. The tower 14 may be formed in any number of sections 14c.

Advantageously, the tower 14 formed from composite material as described above will have reduced mass above the waterline WL relative to a conventional steel tower. Because the FRP composite tower 14 has reduced mass, the mass of the hull 12, including any ballast, required below the water line WL to maintain stability of the floating wind turbine platform 10 may also be reduced. This will reduce the overall cost of the wind generating device.

Figure 4:
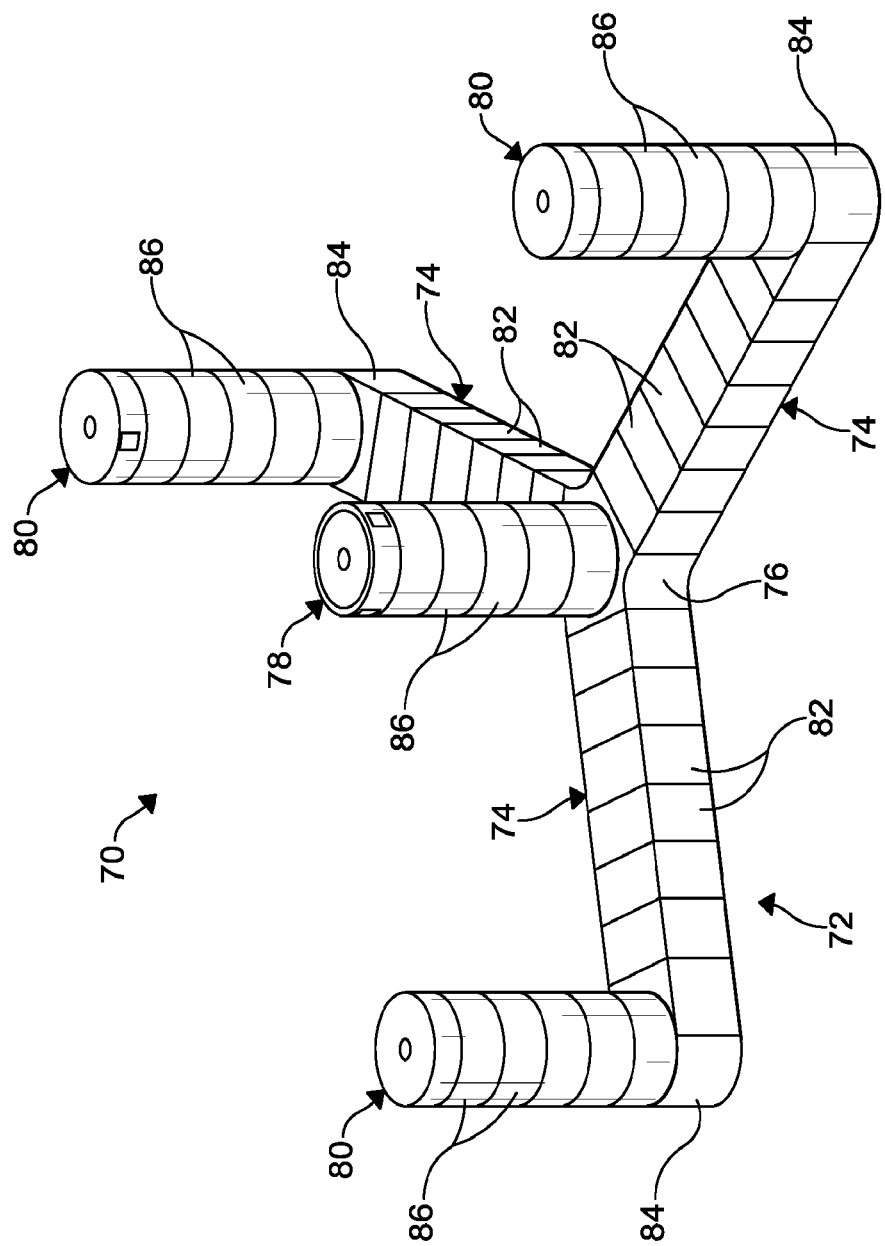
FIG. 4 is a perspective view of a second embodiment of the hull illustrated in FIGS. 1 and 2.

A second embodiment of the hull is shown at 70 in FIG. 4. As shown in FIG. 4, the hull 70 includes a base 72, also shown in FIG. 5, comprising three buoyant bottom beams 74 that extend radially outwardly from a keystone 76. A center column 78 is mounted to the keystone 76, and three outer columns 80 are mounted at or near the distal ends of the bottom beams 74. Although three buoyant bottom beams 74 are shown in FIG. 4, it will be understood that the hull 70 may include more than three buoyant bottom beams 74.

As described in detail below, the bottom beams 74 may be formed from a plurality of beam sections 82 and a column base section 84, upon which the outer columns 80 are mounted. The bottom beams 74 may be formed from any desired number of beam sections 82, such as the six beam sections 82 illustrated in FIG. 4, less than six beam sections 82, or more than six beam sections 82. If desired, the keystone 76 may also be formed in any desired number of sections (not shown).

As also described in detail below, the center column 78 and the outer columns 80 may be similarly formed from a plurality of column sections 86. The center column 78 and the outer columns 80 may be formed from any desired number of column sections 86, such as the six column sections 86 illustrated in FIG. 4, less than six column sections 86, or more than six column sections 86. It will be understood that the center column 78 may be formed from column sections 86 that have a different size than the column sections 86 that form the outer columns 80.

Figure 5:
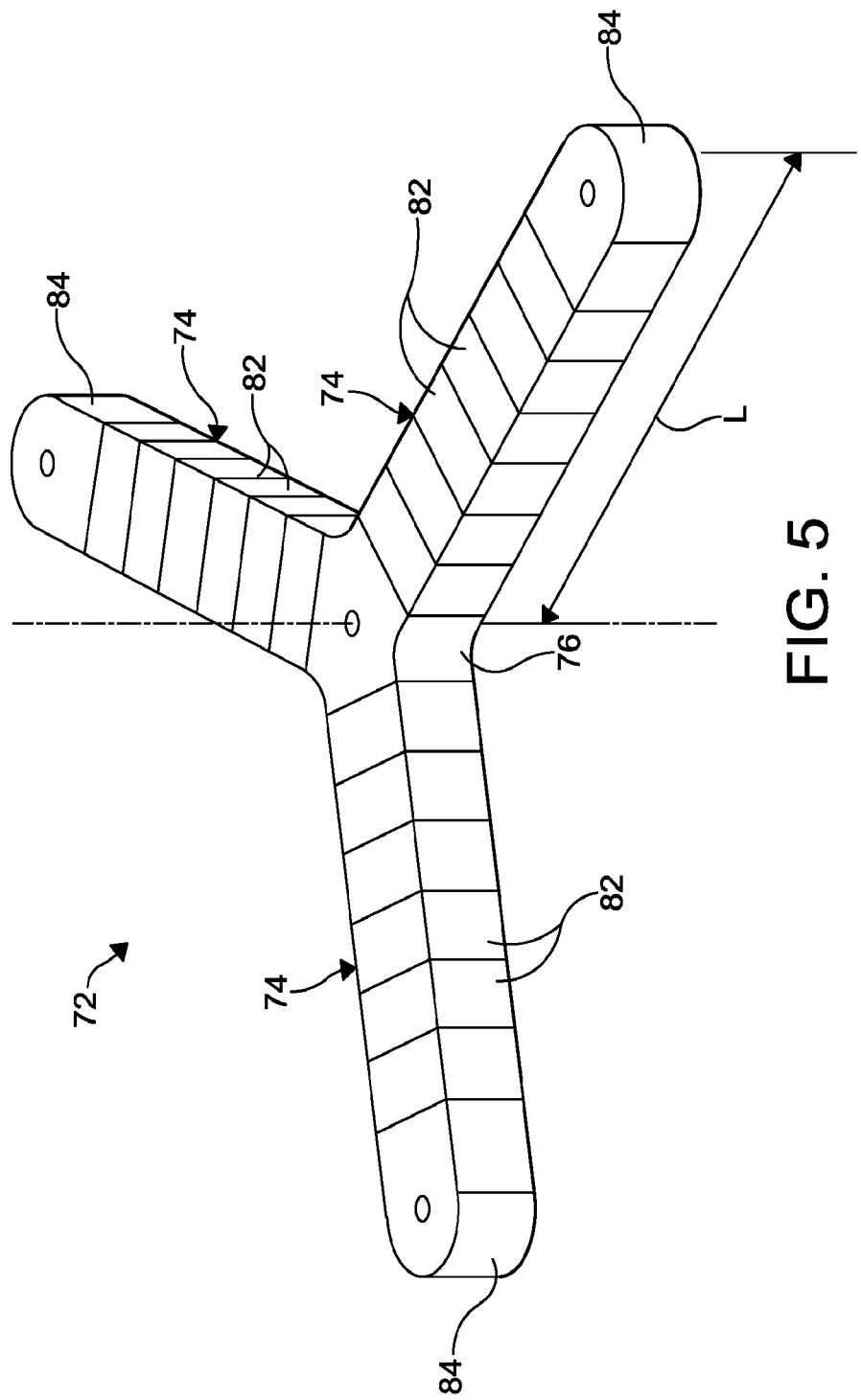
FIG. 5 is a perspective view of the base illustrated in FIG. 4.

The size and dimensions of the floating wind turbine platform 10 may be determined by the size of the wind turbine 16 mounted thereon. For example, as best shown in FIG. 5, for a 6 MW wind turbine 16, the length L of a leg or wing of the base 72, as measured from a center of the keystone 76 to a distal end of the bottom beam 74 is about 140 ft to about 160 ft, and the fully assembled floating wind turbine platform 10 may weigh 7,200 tons or more.

Figure 6:
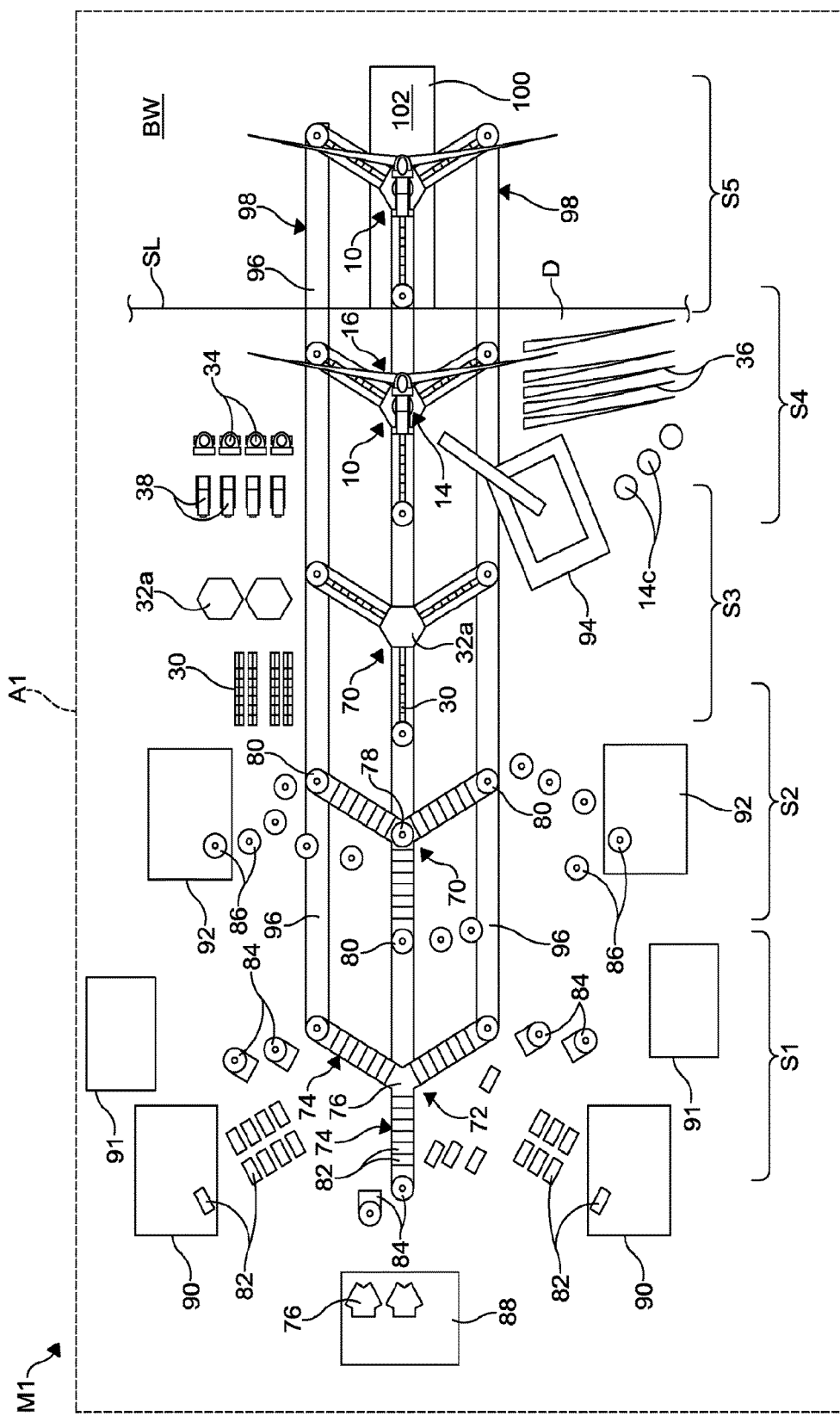
FIG. 6 is a plan view of a floating wind turbine platform assembly area showing a first embodiment of an improved method of constructing, assembling, and launching a floating wind turbine platform.

Referring now to FIG. 6, a first embodiment of a method of constructing, assembling, and launching a floating wind turbine platform, such as the floating wind turbine platform 10, is shown at M1. As shown in FIG. 6, the construction and assembly of the floating wind turbine platform 10 occurs in a construction and assembly area A1 on shore near a body of water BW having a shoreline SL.

The construction and assembly area A1 includes a method of moving the base 72, the hull 70, and/or the completed floating wind turbine platform 10 through the construction and assembly area A1 and to the shoreline SL. Within the assembly area A1, the shoreline SL may be defined by a dock D. In the embodiment illustrated in FIG. 6 the base 72, the hull 70, and/or the completed floating wind turbine platform 10 are formed on a platform (not shown) configured to move on a system of longitudinally extending rails, schematically illustrated at 96. Alternatively, the method of moving the base 72, the hull 70, and/or the completed floating wind turbine platform 10 may include a jack and slide system, or any other method of moving large heavy objects.

Finger piers 98 extend outwardly from the shoreline SL. The rails 96 extend onto the finger piers 98 from the shoreline SL to a distal end of the finger piers 98.

As shown in FIG. 6, the floating wind turbine platform 10 may be constructed and assembled in an assembly line method. In a first step S1 of the method M1, pre-stressed reinforced concrete sections of the components of the base 72 may be formed in a first location. For example, pre-stressed reinforced concrete keystones 76 may be formed in a keystone assembly line area 88. Pre-stressed reinforced concrete beam sections 82 may be formed in a beam section assembly line area 90, and pre-stressed reinforced concrete column base section 84 may be formed in a column base section assembly line area 91. The number of assembly line areas 88, 90, and 91, and the size and capacity of the assembly line areas 88, 90, and 91 will be determined on a desired rate of production, such as for example, a production rate of one floating wind turbine platform 10 per week.

The assembly line areas 88, 90, and 91 may include rebar assembly lines (not shown) and concrete molds (not shown) for forming the keystones 76, the concrete beam sections 82, and the concrete column base sections 84. Alternatively, the rebar assembly area may be located remotely from the assembly line areas 88, 90, and 91.

When formed and cured, the beam sections 82 and the column base sections 84 may be assembled to form the bottom beams 74. The keystone 76 and the bottom beams 74 may then be assembled and post-tensioned longitudinally to define the base 72. The keystone 76 and the bottom beams 74 may be post-tensioned by any desired post-tensioning method, thus applying a compressive force between the keystone 76 and the bottom beams 74. Alternatively, the bottom beams 74 may be cast in place such as by casting a portion and moving the mold (not shown) progressively forward to until the entire bottom beam 74 is formed. This alternative method would eliminate joints between bottom beam sections 82, and also minimize the number of components; i.e., the bottom beam sections 82 that must be handled. The base 72 may then be moved on the rails 96 to a second location where a second step S2 of the method M1 may be performed.

In the second step S2 of the method M1, pre-stressed reinforced concrete column sections 86 may be formed in a column section assembly line area 92. The number of assembly line areas 92, and the size and capacity of the assembly line areas 92 will be determined on a desired rate of production, such as for example, one floating wind turbine platform 10 per week.

The assembly line area 92 may include rebar assembly lines (not shown) and concrete molds (not shown) for forming the column sections 86. Alternatively, the rebar assembly area may be located remotely from the assembly line area 92.

When formed and cured, the column sections 86 may be assembled to onto the keystone 76 and the column base sections 84 of each bottom beam 74 to form the center column 78 and the outer columns 80, respectively. The column sections 86 of the center column 78 and the outer columns 80 may be assembled, such as with a crane 94 and post-tensioned as described above to define the hull 70. For example, the center column 78 may be post-tensioned along its longitudinal axis onto the keystone 76, and the outer columns 80 may be post-tensioned along their longitudinal axes onto the column base sections 84 of the bottom beams 74. If desired, adhesive may be applied between the sections 86 of the center and outer columns 78 and 80 before the center column 78 and the outer columns 80 are post-tensioned together. It will be understood that the step of post-tensioning the hull 70 may be accomplished with any desired number of workers or teams of workers to ensure the desired rate of production, such as for example, a production rate of one floating wind turbine platform 10 per week. The hull 70 may then be moved on the rails 96 to a third location where a third step S3 of the method M1 may be performed.

In the third step S3 of the method M1, secondary structures, such as the top beams 30, which may include the catwalks 32, the tower access platforms 32a, and the ladders 33, and hull mechanical and electrical systems (not shown) may be mounted on and within the hull 70, such as with the crane 94. The hull 70 may then be moved on the rails 96 to a fourth location where a fourth step S4 of the method M1 may be performed.

In the fourth step S4 of the method M1, the components of the tower 14 may be constructed and/or assembled to the hull 70, such as with the crane 94, and the wind turbine 16 installed on the tower 14, also with the crane 94, thus completing construction and assembly of the floating wind turbine platform 10. The tower 14 may be formed from tower sections 14c from any desired material as described above. Once assembled on the center column 78, the tower 14 may be post-tensioned as described above.

Components of the wind turbine 16, including the hubs 34, the nacelles 38, and the blades 36 may be positioned at the fourth location to facilitate assembly thereof. The floating wind turbine platform 10 may then be moved on the rails 96 to a fifth location where a fifth step S5 of the method M1 may be performed.

In the fifth step S5 of the method M1, the floating wind turbine platform 10 is moved on the rails 96 onto the finger piers 98 such that distal ends of two of the bottom beams 74 are moved to distal ends of the finger piers 98 and supported thereon above a surface of the body water BW, and a portion of the distal end of the third bottom beam 74 remains supported on the dock D. Alternatively, a majority of the portion of the third bottom beam 74 under the outer column 80 may be supported on the dock D. The floating wind turbine platform 10 may then be positioned on a launch platform and launched into the body of water BW by one of two launch methods.

Figure 7:
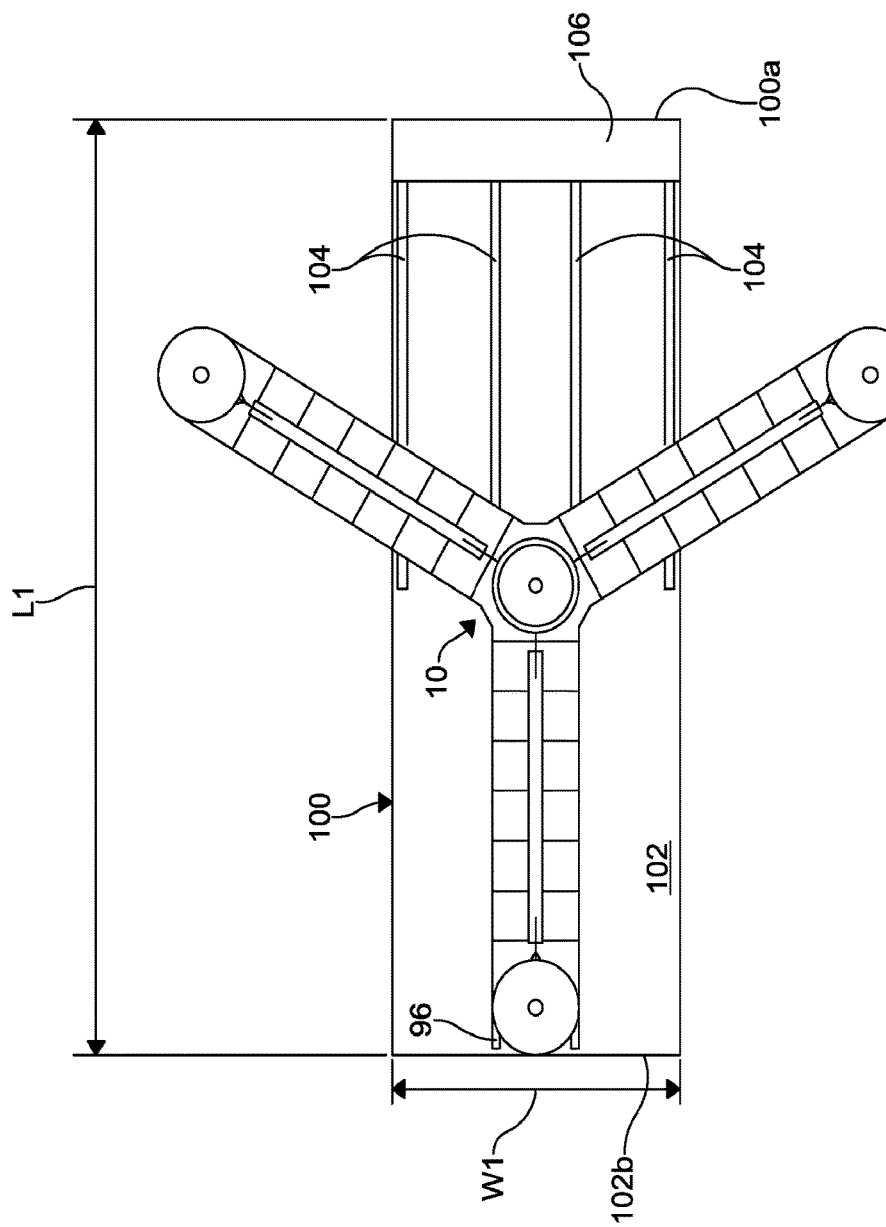
FIG. 7 is a plan view of the floating wind turbine platform illustrated in FIG. 1 shown on a launch barge according to one embodiment of the improved method of this invention.

In a first launch method, the launch platform is a launch barge 100 that may be moved between the finger piers 98 and underneath the floating wind turbine platform 10. The launch barge 100 includes a stern 100*a*, a bow 100*b*, and an upwardly facing deck 102 deck. The launch barge 100 is illustrated in FIGS. 6 and 7. In FIG. 7, the floating wind turbine platform 10 is shown with the tower 14 and the wind turbine 16 removed for clarity. Ballast within the launch barge 100 will be configured such that the upwardly facing deck 102 of the launch barge 100 is initially below, and not in contact with, the floating wind turbine platform 10. Once positioned beneath the floating wind turbine platform 10, as shown in FIG. 6, enough ballast may be removed from the launch barge 100 to cause the launch barge 100 to rise in the body of water BW until the launch barge 100 lifts the floating wind turbine platform 10 off of the finger piers 98 and the dock D, thereby transferring the floating wind turbine platform 10 onto the launch barge 100. The launch barge 100 may then be towed to a launch area in the body of water BW. It will be understood that the ballast within the launch barge 100 may be moved, laterally or longitudinally, within the launch barge 100 to compensate for the eccentric placement of the floating wind turbine platform 10 on the deck 102.

Alternatively, the launch barge 100 may be used to launch the base 72, the hull 70, or any other portion of the floating wind turbine platform 10. When the base 72, the hull 70, or a portion of the floating wind turbine platform 10 is launched prior to completion of the floating wind turbine platform 10, the remaining components may be assembled while the base 72, the hull 70, or a portion of the floating wind turbine platform 10 is floating in the body of water BW adjacent the dock D, the shoreline SL, a pier, or other structure.

The size and dimensions of the launch barge may be determined by the size floating wind turbine platform 10 to be launched. For example, as best shown in FIG. 7, for a floating wind turbine platform 10 configured to mount a 6 MW wind turbine 16, the launch barge may have a length L1 within the range of about 300 ft to about 400 ft, and a width W1 within the range of about 90 ft to about 110 ft. It will be understood that as the size of the wind turbine 16 varies, the size of the hull 70 may also vary, and therefore the size and dimensions of the launch barge or launch barges may also vary.

As further shown in FIG. 7, the launch barge 100 may include longitudinally extending launch rails 104 on the deck 102 thereof. The launch barge 100 may also include a rocker arm or pivot platform, shown schematically at 106, at the stern 100*a* thereof.

Figure 13:
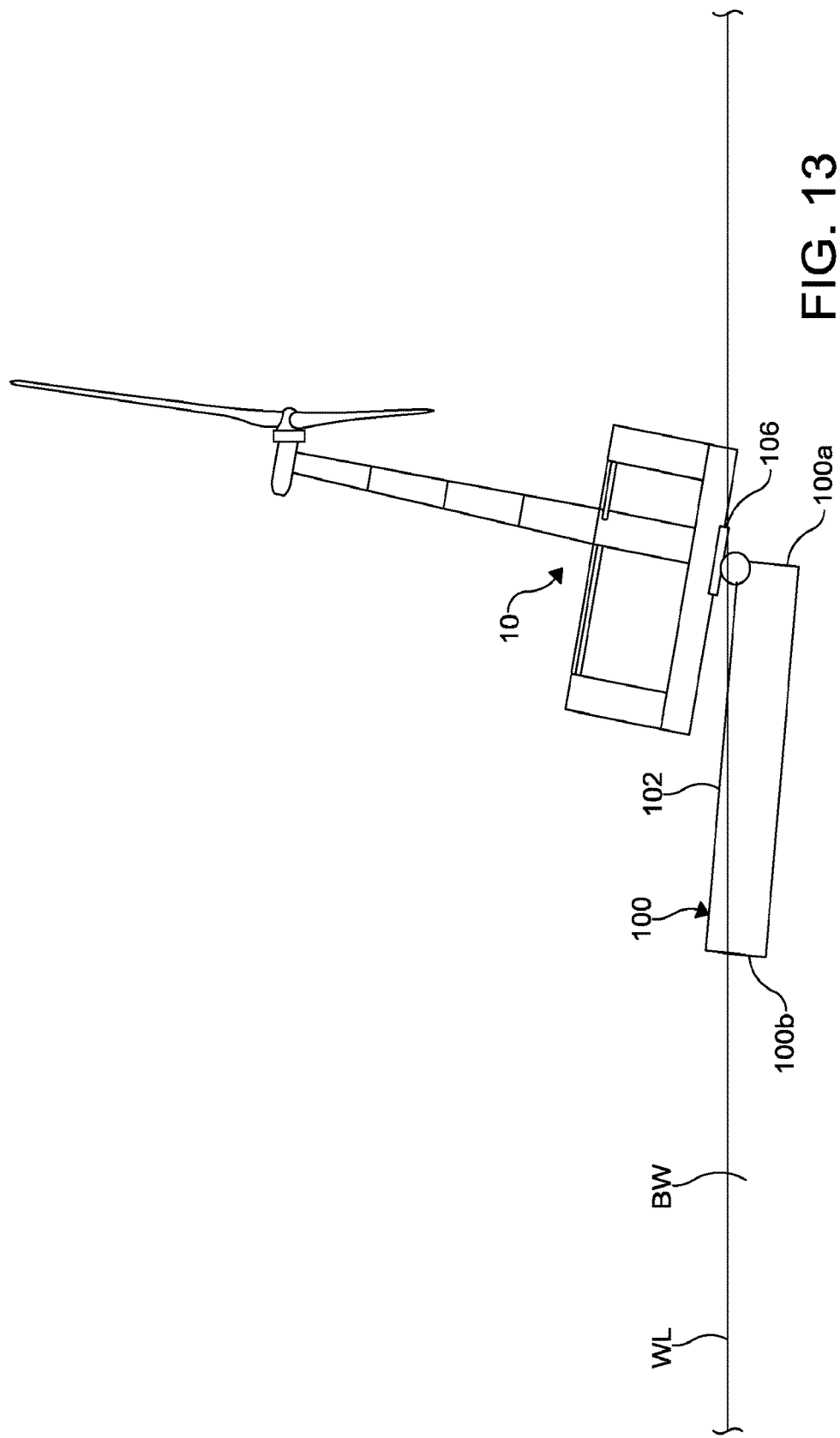
FIG. 13 is an elevational view of the floating wind turbine platform being launched from the launch barge illustrated in FIG. 7.

Once towed to the launch area in the body of water BW, the floating wind turbine platform 10 (shown with the tower 14 and the wind turbine 16 removed in FIG. 7) may then be slid or otherwise moved into the water using one or more winches (not shown), or one or more tug boats (not shown). The floating wind turbine platform 10 may also be launched by lowering the stern 100*a* of the launch barge 100, such as by removing ballast therefrom, until the floating wind turbine platform 10 is caused to float. As the stern 100*a* is lowered, the floating wind turbine platform 10 may move on the launch rails 104 toward the stern 100*a*. When the center of gravity of the floating wind turbine platform 10 is moved past a center of the pivot platform 106, the pivot platform 106 will pivot relative to the deck 102 of the launch barge 100, as schematically illustrated in FIG. 13, thus assisting the forward and downward movement of the floating wind turbine platform 10 off of the deck 102 and into the body of water BW.

FIG. 8A illustrates the hull 70 floating in the body of water BW on the launch barge 100. FIG. 8B illustrates the launch barge 100 after the stern 100*a* has been lowered and the hull 70 has begun to slide into the water. FIG. 9A illustrates the hull 70 with the tower 14 mounted thereon floating in the body of water BW on the launch barge 100. FIG. 9B illustrates the launch barge 100 after the stern 100*a* has been lowered and the hull 70 with its attached tower 14 has begun to slide into the water. Similarly, FIG. 10A illustrates the completed floating wind turbine platform 10 floating in the body of water BW on the launch barge 100. FIG. 10B illustrates the launch barge 100 after the stern 100*a* has been lowered and the floating wind turbine platform 10 has begun to slide into the water.

Figure 11:
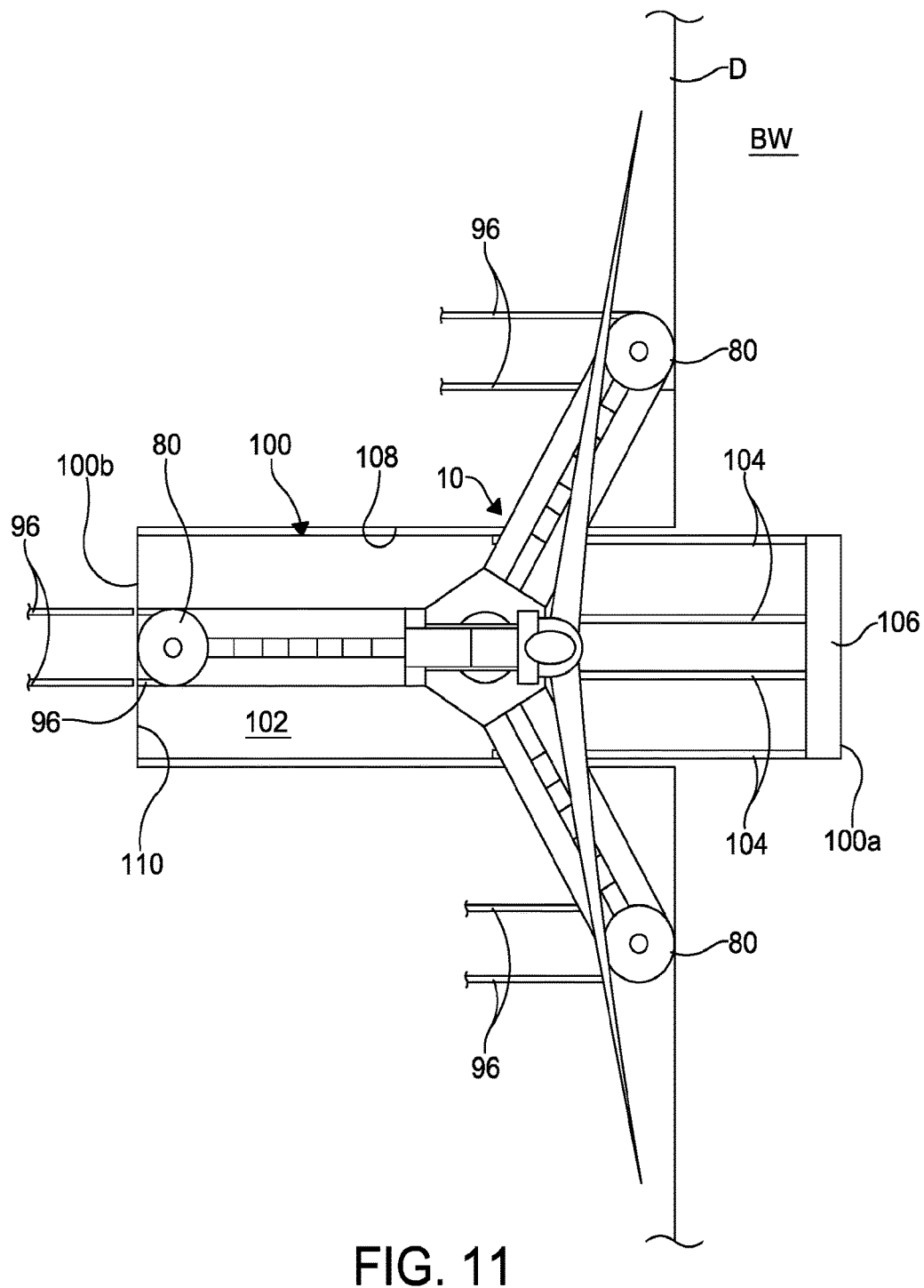
FIG. 11 is a plan view of the launch barge illustrated in FIG. 7 shown in a slip and showing the floating wind turbine platform positioned over the slip and the launch barge according to another embodiment of the improved method of this invention.

Referring now to FIG. 11, an alternative method of positioning the launch barge 100 beneath the floating wind turbine platform 10 is shown. As shown in FIG. 11, the dock D includes a slip 108 configured to have the launch barge 100 positioned therein. In this method, the floating wind turbine platform 10 is moved on the rails 96 onto the dock D and over the slip 108 such that distal ends of two of the bottom beams 74 are moved to an edge of the dock D and supported thereon, and a portion of the distal end of the third bottom beam 74 remains supported on the dock D at an end wall 110 of the slip 108. Alternatively, a majority of the portion of the third bottom beam 74 under the outer column 80 may be supported on the dock D at an end wall 110 of the slip 108. The floating wind turbine platform 10 may then be transferred onto the launch barge 100 and launched into the body of water BW by the launch barge 100 as described above.

In a second launch method, the launch platform is a semi-submersible launch barge 120. As shown in FIGS. 12B and 12 C, the semi-submersible launch barge 120 may be similar in size to the launch barge 100 and includes a stern 120*a*, a bow 120*b*, and an upwardly facing deck 122 deck. The semi-submersible launch barge 120 includes buoyant stern stability columns 124*a* and buoyant bow stability columns 124*b* that extend outward from the deck 122 at the four corners of the semi-submersible launch barge 120. The bow stability columns 124*b* at the bow 120*b* are removably mounted to the semi-submersible launch barge 120. The stability columns 124*a* at the stern 120*a* may also be removably mounted to the semi-submersible launch barge 120, or may be permanently mounted thereto.

As described above, the floating wind turbine platform 10 may moved on the rails 96 (not shown in FIGS. 12A and 12B) and onto the finger piers 98 such that distal ends of two of the bottom beams 74 are moved to distal ends of the finger piers 98 and supported thereon above a surface of the body water BW, and a portion of the distal end of the third bottom beam 74 remains supported on the dock D. Alternatively, a majority of the portion of the third bottom beam 74 under the outer column 80 may be supported on the dock D.

In the second launch method, the semi-submersible launch barge 120 may be moved between the finger piers 98, or into the slip 108 described above, and underneath the floating wind turbine platform 10. Ballast within the semi-submersible launch barge 120 will be configured such that the upwardly facing deck 122 of the semi-submersible launch barge 120 is initially below, and not in contact with, the floating wind turbine platform 10. Once positioned beneath the floating wind turbine platform 10, as shown in FIG. 12A, the stability columns 124b may be mounted at the corners of the bow 120b, as shown in FIG. 12B. Enough ballast may then be removed from the semi-submersible launch barge 120 to cause the semi-submersible launch barge 120 to rise in the body of water BW until the semi-submersible launch barge 120 lifts the floating wind turbine platform 10 off of the finger piers 98 and the dock D, thereby transferring the floating wind turbine platform 10 onto the semi-submersible launch barge 120. The semi-submersible launch barge 120 may then be towed to a launch area in the body of water BW, as shown in FIG. 12C. It will be understood that the ballast within the semi-submersible launch barge 120 may be moved, laterally or longitudinally, within the semi-submersible launch barge 120 to compensate for the eccentric placement of the floating wind turbine platform 10 on the deck 122.

Once towed to the launch area in the body of water BW, ballast in the semi-submersible launch barge 120 may be removed until the semi-submersible launch barge 120 is completely submerged and the four buoyant stability columns 124a and 124b remain above the surface of the water, thus allowing the floating wind turbine platform 10 to float freely in the body of water BW, as shown in FIG. 12D. As shown in FIG. 12E, the floating wind turbine platform 10 may then be towed away from the semi-submersible launch barge 120 and to a location wherein the floating wind turbine platform 10 and its attached wind turbine 16 will be placed in to operation, such as a wind turbine farm. The semi-submersible launch barge 120 may then be re-floated and recovered for future use.

Figure 14:
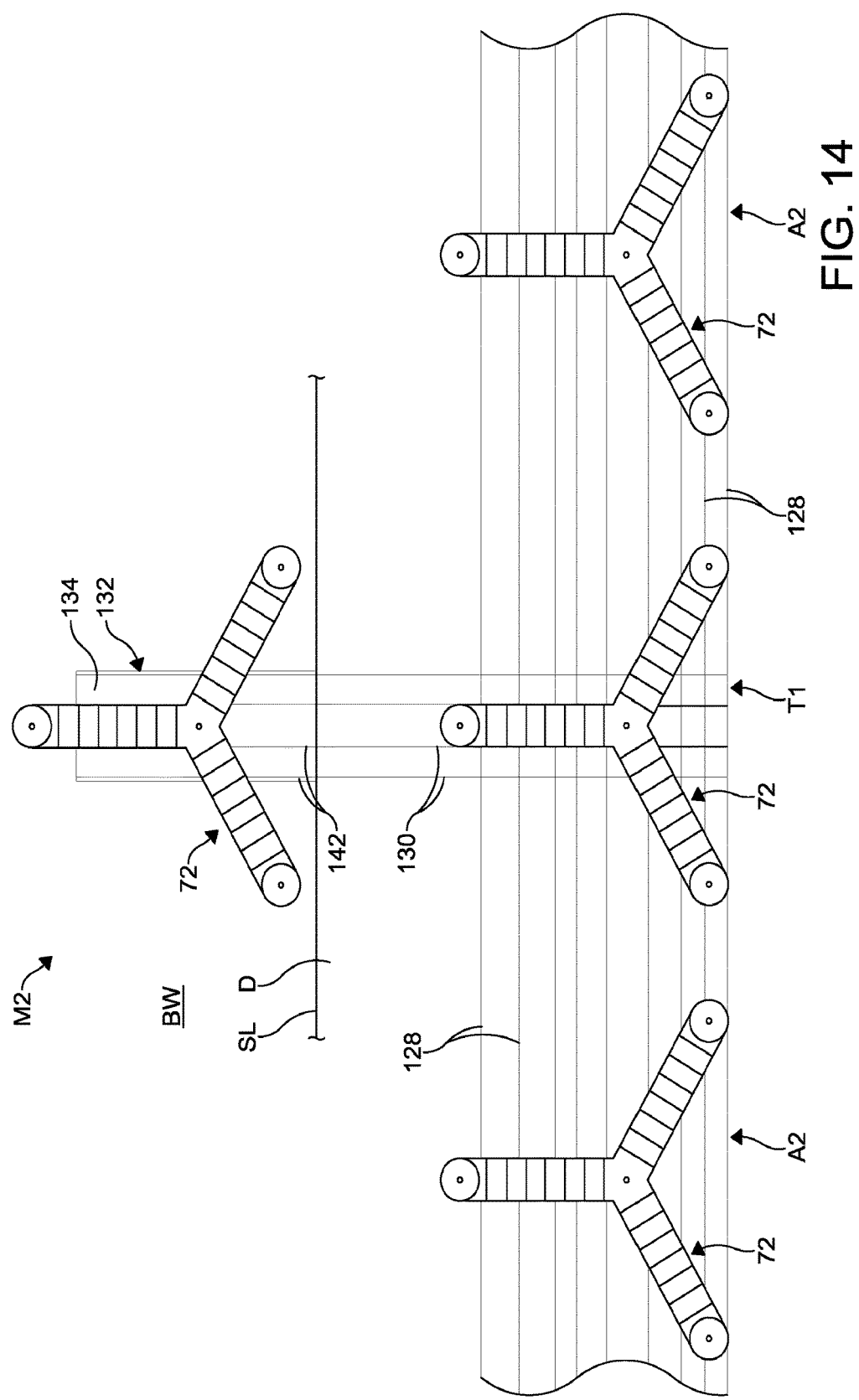
FIG. 14 is a plan view of a floating wind turbine platform assembly area showing a second embodiment of an improved method of constructing, assembling, and launching a floating wind turbine platform.

Referring now to FIG. 14, a second embodiment of a method of constructing, assembling, and launching a floating wind turbine platform, such as the floating wind turbine platform 10, is shown at M2.

As shown in FIG. 14, the construction and assembly of at least a portion of the floating wind turbine platform 10 occurs in one or more construction and assembly areas A2 on shore near a body of water BW having a shoreline SL.

The construction and assembly areas A2 include a method of moving the base 72, the hull 70, and/or the completed floating wind turbine platform 10 through the construction and assembly areas A2 and to the shoreline SL. Within the assembly area A2, the shoreline SL may be defined by the dock D. In the embodiment illustrated in FIG. 14 the base 72 is formed on a platform (not shown) configured to move on a system of longitudinally extending rails, schematically illustrated at 128. The rails 128 extend substantially parallel with the shoreline SL or an edge of the dock D. Although FIG. 14 illustrates the base 72 being constructed and assembled in the assembly area A2, the second embodiment of the method M2 of constructing, assembling, and launching a floating wind turbine platform, may be used to construct and assemble the hull 70, and/or the completed floating wind turbine platform 10. Alternatively, the method of moving the base 72, the hull 70, and/or the completed floating wind turbine platform 10 may include a jack and slide system, or any other method of moving large heavy objects.

A second system of longitudinally extending rails are schematically illustrated at 130. The rails 130 extend substantially perpendicularly to the rails 128 and the shoreline SL and allow for movement of the base 72 from the rails 128 to the shoreline SL for launching into the body of water BW.

Figure 18:
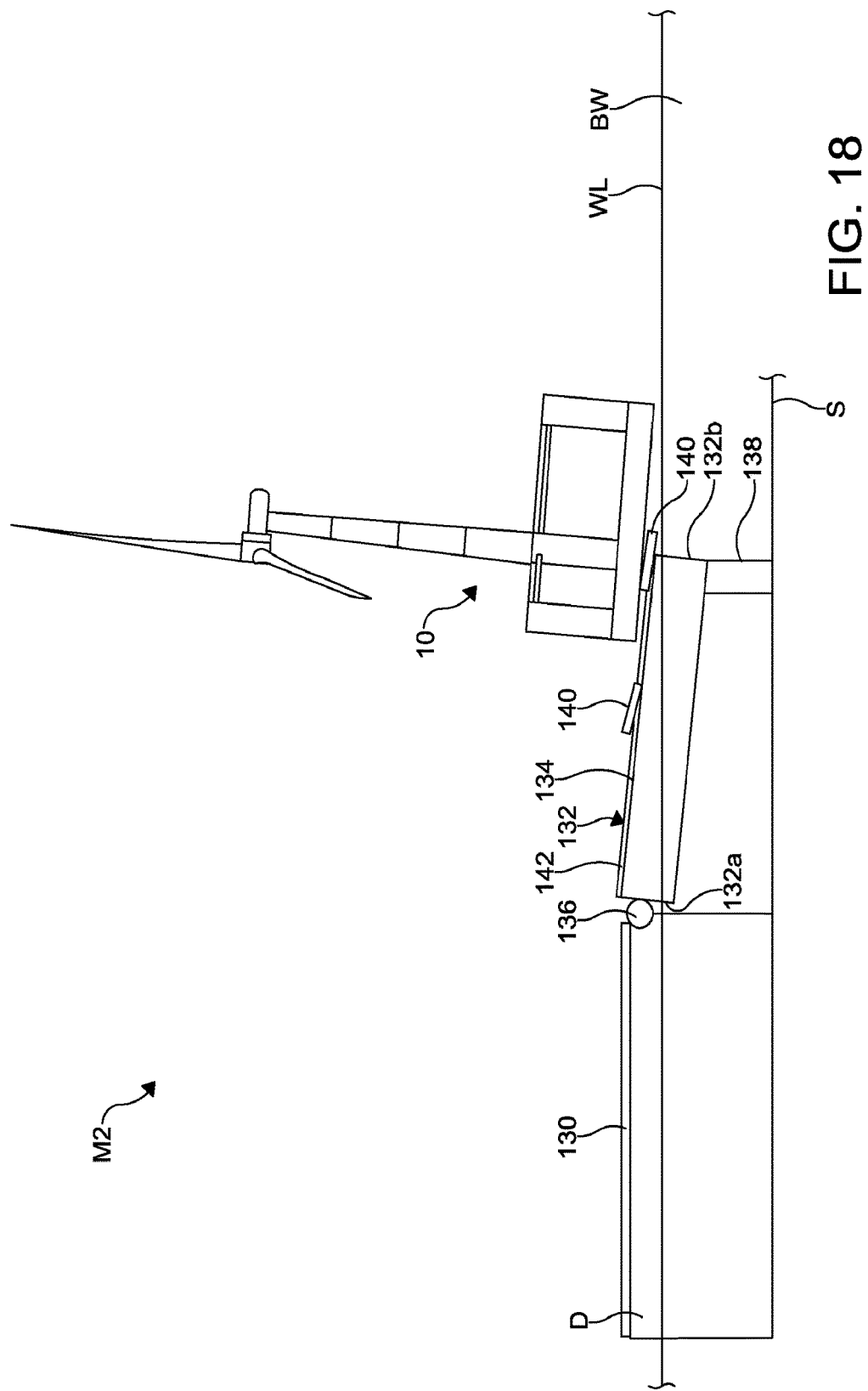
FIG. 18 is an elevational view of the floating wind turbine platform being launched from the launch dock illustrated in FIG. 14.

In the second embodiment of the method M2, the launch platform is a launch dock 132 that is attached to the dock D. As schematically illustrated in FIG. 18, the launch dock 132 includes a first end 132a, a second end 132b, and an upwardly facing deck 134. The first end 132a may be pivotally attached to the dock D by a pivot mechanism 136. The second end 132b may be supported in the water by movable pylons 138. One or more pivot platforms 140 may be mounted to the deck 134. Launch rails 142 are attached to the deck 134 and facilitate the movement of the base 72 from the rails 130 on the dock D onto to the launch dock 132.

The base 72 may be constructed using any of the methods described herein. In a manner similar to the method M1 shown in FIG. 6, the floating wind turbine platform 10 may be constructed and assembled in an assembly line method in one or more of the assembly areas A2. Once completed, the base 72 may then be moved on the rails 128 to a transfer area T1 where the rails 128 intersect the rails 130. The base 72 may then be moved on the rails 130 and 142 onto the launch dock 132.

In a second step of the method M2, the base 72 may be launched into the body of water BW. To launch the base 72, or the floating wind turbine platform 10 as shown in FIG. 18, the pylons 138 may be lowered, such as by a system of hydraulic jacks, to lower the second end 132b of the launch dock 132 into the water. Alternatively, the launch dock 132 may be a floating dock. Rather than the pylons 138, ballast may be removed or added to the launch dock 132 to respectively lower or raise the second end 132b of the launch dock 132.

As the second end 132b is lowered, the base 72, or floating wind turbine platform 10 as shown in FIG. 18, may move on the launch rails 142 toward the second end 132b. When the center of gravity of the base 72 is moved past a center of one of the pivot platforms 140, the pivot platform 140 will pivot relative to the deck 134 of the launch dock 132 to assist its forward and downward movement of the angled surface of the launch dock 132, thus assisting the forward and downward movement of the base 72 along the launch rails 142, off of the deck 134, and into the body of water BW.

Alternatively, in lieu of the launch dock 132, the method M2 may include the launch barge 100 or the semi-submersible launch barge 120, described above.

When the base 72, the hull 70, or a portion of the floating wind turbine platform 10 is launched according to the method M2, but prior to completion of the floating wind turbine platform 10, the remaining components may be assembled while the base 72, the hull 70, or a portion of the floating wind turbine platform 10 is floating in the body of water BW adjacent the dock D, the shoreline SL, a pier, or other structure.

Figure 15:
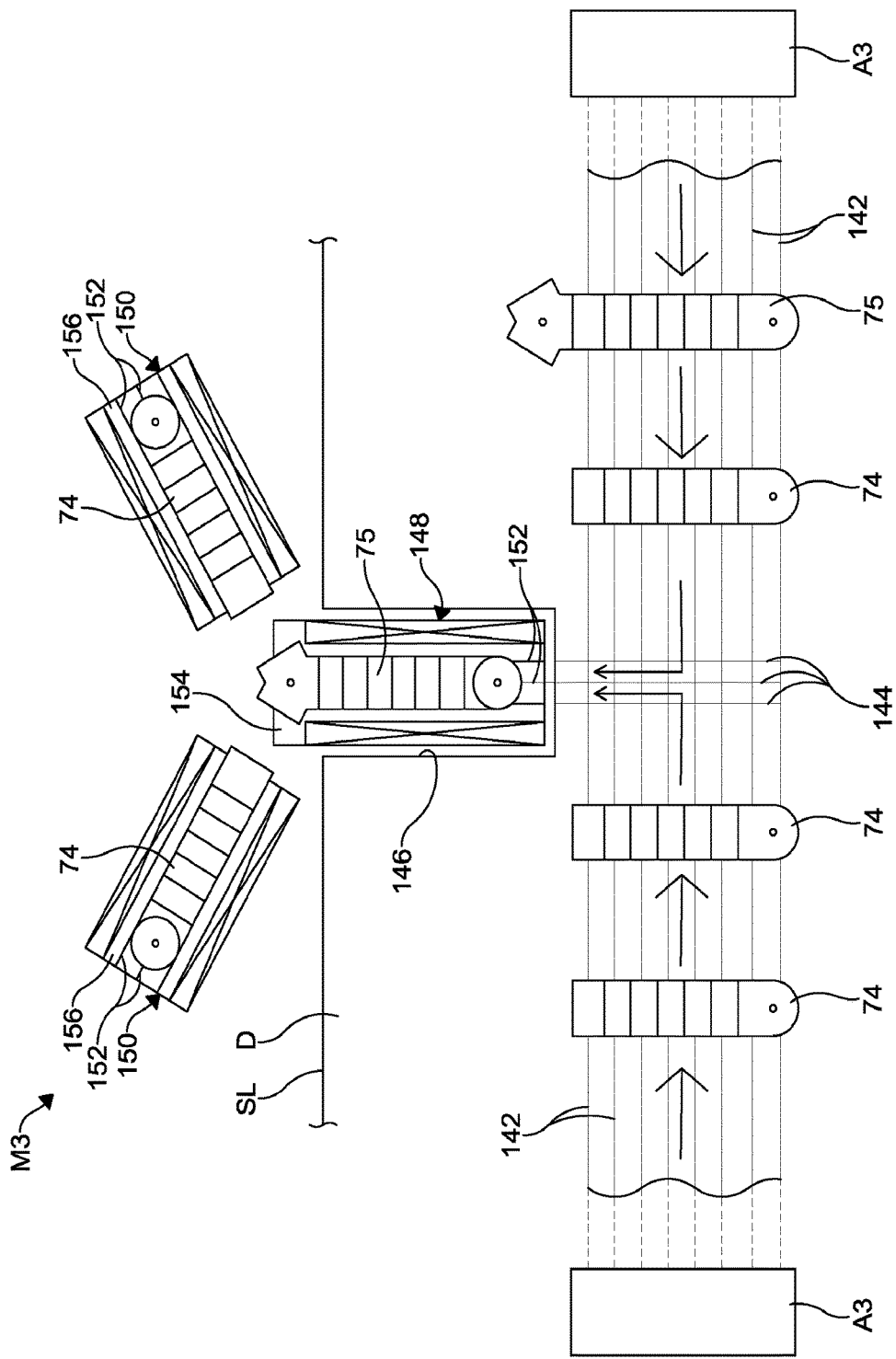
FIG. 15 is a plan view of a floating wind turbine platform assembly area showing a third embodiment of an improved method of constructing, assembling, and launching a floating wind turbine platform.

Referring now to FIG. 15, a third embodiment of a method of constructing, assembling, and launching the floating wind turbine platform 10, or a portion thereof, is shown at M3.

As shown in FIG. 15, the construction and assembly of bottom beams 74 and wings 75 in one or more construction and assembly areas A3 on shore near a body of water BW having a shoreline SL. As used herein, a wing 75 is defined as a bottom beam 74 with the keystone 76 attached thereto.

The construction and assembly areas A3 may be located at any desired location and is connected to a method of moving the bottom beams 74 and wings 75 from and through the construction and assembly areas A3 and to the shoreline SL. As shown in FIG. 15, the shoreline SL may be defined by the dock D. The bottom beams 74 and wings 75 may be assembled on a platform (not shown) configured to move on a system of longitudinally extending rails, schematically illustrated at 142. The rails 142 extend substantially parallel with the shoreline SL or an edge of the dock D. Alternatively, the method of moving the bottom beams 74 and the wings 75 may include a jack and slide system, a system of heavy lifting airbags, or a self-propelled modular transport (SPMT) system, or any other method of moving large heavy objects.

A second system of longitudinally extending rails is schematically illustrated at 144. The rails 144 extend substantially perpendicularly to the rails 142 and the shoreline SL and allow for movement of the bottom beams 74 and the wings 75 from the rails 142 to the shoreline SL for launching into the body of water BW.

The dock D includes a slip 146 configured to have launch barges 148 and 150 positioned therein. As shown in FIG. 15, the launch barge 148 is configured to receive, float, and launch the wing 75, and the launch barge 150 is configured to receive, float, and launch the bottom beam 74. Launch rails 152 are attached to the decks 154 and 156, respectively, of the launch barges 148 and 150, and facilitate the movement of the bottom beams 74 and the wings 75 from the rails 144 on the dock D onto to the launch barges 148 and 150.

The bottom beams 74 and the wings 75 may be constructed in the assembly areas A3 using any of the methods described herein. Once completed, the bottom beams 74 and the wings 75 may then be moved on the rails 142 to a transfer area T2 where the rails 142 intersect the rails 144. The bottom beams 74 and the wings 75 may then be moved on the rails 144 and 152 onto the launch barges 148 and 150. The bottom beams 74 and the wings 75 may then be launched into the body of water BW as described above.

The bottom beams 74 and the wings 75 may be moved onto the launch barges 148 and 150 in any sequence, but preferably two bottom beams 74 will be moved onto the launch barges 150 for one wing 75 that is moved onto the launch barge 148, as shown in FIG. 17D.

Alternatively, three bottom beams 74 may be constructed, assembled, and launched on three launch barges 164, as shown in FIG. 17C. In this alternate embodiment of the method M3, the keystone 76 may be constructed and assembled in the assembly areas A3, or in an adjacent assembly area, and moved to a launch barge 166, as shown in FIG. 17C, in the same manner as the bottom beams 74 and the wings 75.

The bottom beams 74 and the wings 75 may be launched from the launch barges 150 and 148 as described above until the bottom beams 74 and the wings 75 are floating freely. One wing 75 and two bottom beams 74 may then be joined together to define the base 72 and moved in the body of water BW to a floating assembly area adjacent the dock D, the shoreline SL, a pier, or other structure, wherein the remaining portions of the floating wind turbine platform 10 may be assembled thereto.

If desired, the barges used to launch the bottom beams 74 and the wings 75 may be configured similarly to the semi-submersible launch barge 120, described above. Alternatively, in lieu of the launch barges 148 and 150, the method M3 may include a launch dock configured similarly to the launch dock 132, described above.

Referring now to FIGS. 17A through 17E, various combinations of portions of the base 72, the hull 70, and the floating wind turbine platform 10 may be constructed and assembled in assembly areas on shore, and launched into the body of water BW on semi-submersible launch barges that are configured to the structure being launched. For example, for the base 72, the hull 70, and the completed floating wind turbine platform 10 configured to mount a 6 MW wind turbine 16, one embodiment of the semi-submersible launch barge 160 may have a length L2 within the range of about 250 ft to about 270 ft, and a width W2 within the range of about 270 ft to about 290 ft, as shown in FIG. 17A. Alternatively, another embodiment of the semi-submersible launch barge 162 may have a length L3 within the range of about 155 ft to about 175 ft, and a width W3 within the range of about 140 ft to about 160 ft, as shown in FIG. 17B.

Similarly, the launch barge 150 may have a length L4 within the range of about 110 ft to about 130 ft, and a width W4 within the range of about 65 ft to about 75 ft, and the launch barge 148 may have a length L5 within the range of about 165 ft to about 185 ft, and a width W5 within the range of about 65 ft to about 85 ft, as shown in FIG. 17D.

Alternatively, three bottom beams 74 may be constructed, assembled, and launched on three launch barges 164, as shown in FIG. 17C. In this alternate embodiment of the method M3, the keystone 76 may be constructed and assembled in the assembly areas A3 or an adjacent assembly area and moved to a launch barge 166, as shown in FIG. 17C, in the same manner as the bottom beams 74 and the wings 75. The launch barge 164 may have a length L6 within the range of about 125 ft to about 145 ft, and a width W6 within the range of about 60 ft to about 80 ft, and the launch barge 166 may have any desired shape and size. In FIG. 17C, the launch barge 166 is substantially hexagonal. Alternatively, the launch barge 166 may have any other desired shape, including substantially rectangular.

In an additional embodiment of the method M3, two bottom beams 74 and the keystone 76 may be constructed and assembled to define a base subassembly 168, as shown in FIG. 17E. The base subassembly 168 may be constructed and assembled in the assembly areas A3 or an adjacent assembly area and moved to a launch barge 170, also shown in FIG. 17E, in the same manner as the bottom beams 74 and the wings 75. A third bottom beam 74 may be constructed, assembled, and launched on the launch barge 164 as described above. The launch barge 170 may have a length L7 within the range of about 100 ft to about 120 ft, and a width W7 within the range of about 270 ft to about 290 ft.

Figure 16:
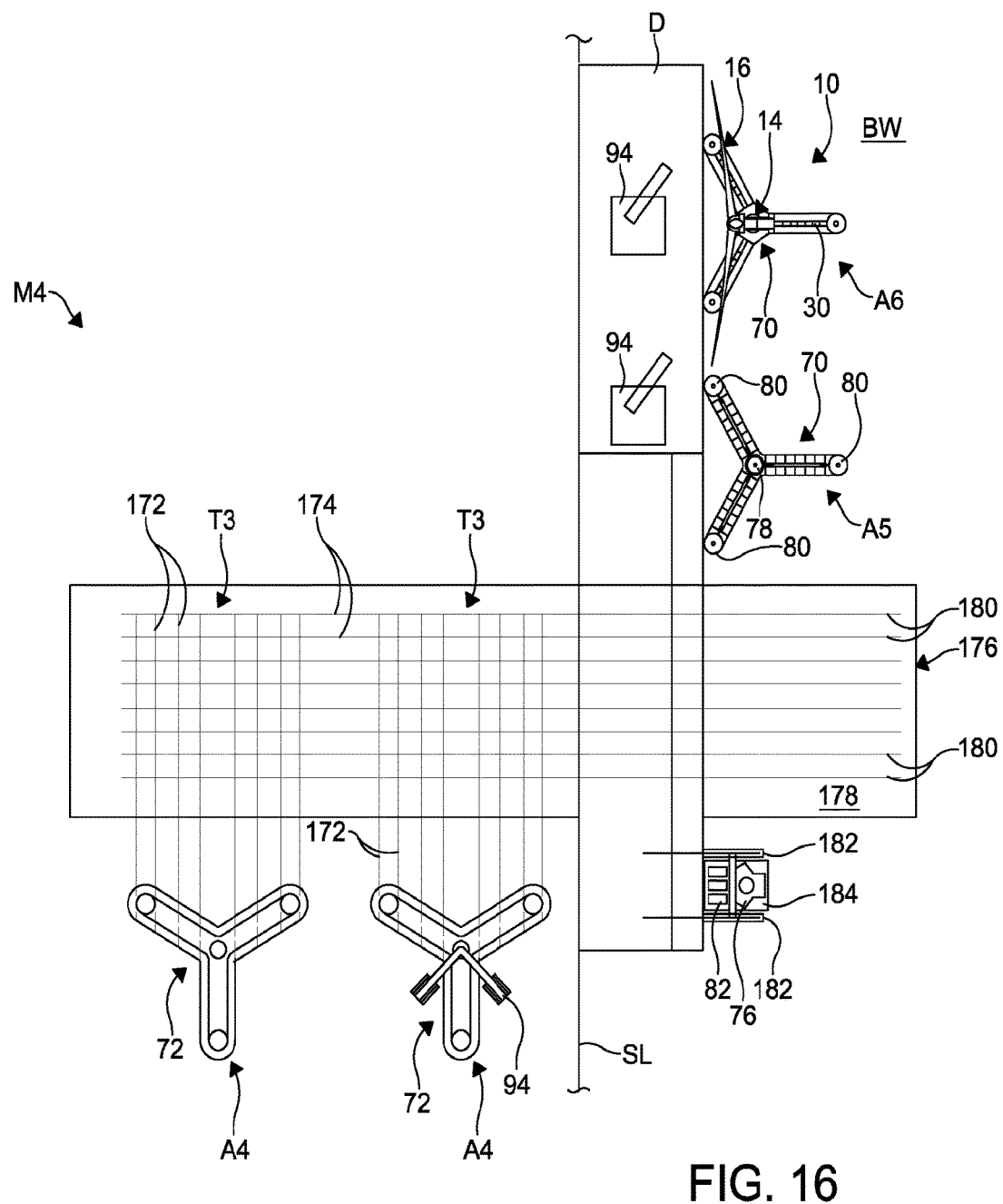
FIG. 16 is a plan view of a floating wind turbine platform assembly area showing a fourth embodiment of an improved method of constructing, assembling, and launching a floating wind turbine platform.

Referring now to FIG. 16, a fourth embodiment of a method of constructing, assembling, and launching a floating wind turbine platform, such as the floating wind turbine platform 10, is shown at M4.

As shown in FIG. 16, the construction and assembly of the floating wind turbine platform 10 occurs in one or more construction and assembly areas A4 on shore near a body of water BW having a shoreline SL.

The construction and assembly areas A4 include a method of moving the base 72, the hull 70, and/or the completed floating wind turbine platform 10 through the construction and assembly areas A4 and to the shoreline SL. A dock D may be constructed at the shoreline SL and extend into the body of water BW. Alternatively, the shoreline SL may be defined by the dock D.

In the embodiment illustrated in FIG. 16 the base 72 is formed on a platform (not shown) configured to move on a system of longitudinally extending rails, schematically illustrated at 172. The rails 172 extend substantially parallel with the shoreline SL or an edge of the dock D. Although FIG. 16 illustrates the base 72 being constructed and assembled in the assembly area A4, the fourth embodiment of the method M4 of constructing, assembling, and launching a floating wind turbine platform, may be used to construct and assemble the hull 70, and/or the completed floating wind turbine platform 10. Alternatively, the method of moving the base 72, the hull 70, and/or the completed floating wind turbine platform 10 may include a jack and slide system, or any other method of moving large heavy objects. The base 72 may be assembled, such as with the crane 94 and post-tensioned as described above.

A second system of longitudinally extending rails is schematically illustrated at 174. The rails 174 extend substantially perpendicularly to the rails 172 and the shoreline SL and allow for movement of the base 72 from the rails 172 to the shoreline SL for launching into the body of water BW.

A launch barge 176 is moored to the dock D, and includes an upwardly facing deck 178. Launch rails 180 are attached to the deck 178 and facilitate the movement of the base 72 from the rails 174 onto to the launch barge 176.

Two additional floating assembly areas A5 and A6 are defined adjacent the dock D and each assembly area A5 and A6 may include one of the cranes 94.

If desired, finger piers 182 may extend outwardly from the shoreline SL or the dock D. The finger piers 182 may be configured to receive and unload a barge 184 that may be used to transport floating wind turbine tower 10 components, such as keystones 76 or beam sections 82 that have been constructed at a site remote from the assembly area A4. A crane, such as a gantry crane 186 may be provided to unload the barge 184.

The base 72 may be constructed using any of the methods described herein. As shown in FIG. 6, the base 72 may be constructed and assembled in an assembly line method in one or more of the assembly areas A4. Once completed, the base 72 may then be moved on the rails 172 to a transfer area T3 where the rails 172 intersect the rails 174. The base 72 may then be moved on the rails 174 and 180 onto the launch barge 176.

In a second step of the method M4, the base 72 may be launched from the launch barge 176 into the body of water BW, as described above. The floating base 72 will then be moved to the assembly area A5 where a third step of the method M4 may be performed. For example, in the third step, the columns 78 and 80 may be constructed and/or assembled to the base 72 at assembly area A5, thus defining the hull 70.

As in the first method M1, the column sections 86 of the center column 78 and the outer columns 80 may be assembled, such as with a crane 94 and post-tensioned to define the hull 70. For example, the center column 78 may be post-tensioned along its longitudinal axis onto the keystone 76, and the outer columns 80 may be post-tensioned along their longitudinal axes onto the column base sections 84 of the bottom beams 74. If desired, adhesive may be applied between the sections 86 of the center and outer columns 78 and 80 before the center column 78 and the outer columns 80 are post-tensioned together. It will be understood that the step of post-tensioning the hull 70 may be accomplished with any desired number of workers or teams of workers to ensure the desired rate of production, such as for example, one floating wind turbine platform 10 per week. The hull 70 may then be moved, such as by towing in the water, to assembly area A6 where a fourth step of the method M4 may be performed.

In the fourth step of the method M4, secondary structures, such as the top beams 30, which may include the catwalks 32, the tower access platforms 32a, and the ladders 33, may be mounted on to the hull 70, such as with the crane 94. Hull mechanical and electrical systems (not shown) may also be mounted on and within the hull 70, such as with the crane 94. Additionally, the components of the tower 14 may be constructed and/or assembled to the hull 70, such as with the crane 94, and the wind turbine 16 installed on the tower 14, also with the crane 94, thus completing construction and assembly of the floating wind turbine platform 10.

Alternatively, in lieu of the launch barge 176, the method M4 may include any of the launch barges shown in FIGS. 17A through 17E, or the semi-submersible launch barge 120, described above.

The floating wind turbine platform 10 may then be towed away from the dock D and to a location wherein the floating wind turbine platform 10 and its attached wind turbine 16 will be placed in to operation, such as a wind turbine farm.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of constructing and assembling a floating wind turbine platform comprising:
   constructing pre-stressed concrete sections of a floating wind turbine platform base in an on-shore assembly area;
   assembling the floating wind turbine platform base sections to form the base at a first assembly location in the on-shore assembly area;
   moving the base to a second assembly location in the on-shore assembly area;
   constructing pre-stressed concrete sections of floating wind turbine platform columns at the second assembly location;
   assembling the column sections to form a center column and a plurality of outer columns on the base to define a hull at the second assembly location in the on-shore assembly area;
   moving the hull to a third assembly location in the on-shore assembly area;
   mounting secondary structures on and within the hull at the third location;
   moving the hull to a fourth assembly location in the the on-shore assembly area;
   constructing a wind turbine tower on the center column at the fourth assembly location;
   mounting a wind turbine on the wind turbine tower at the fourth assembly location, thus defining the floating wind turbine platform;
   moving the floating wind turbine platform to a launch platform in a fifth assembly location; and
   launching the floating wind turbine platform into a body of water;
   wherein the base is assembled on a platform configured to move on a system of rails;
   wherein the rails extend between the first, second, third, fourth, and fifth assembly locations;
   wherein the fifth assembly location includes a dock having two finger piers extending therefrom into the body of water; and
   wherein the finger piers include a system of rails thereon, the method further including moving the floating wind turbine platform on the rails in the fifth assembly location onto the rails of the finger piers such that a portion of the base is supported on the finger piers above a surface of the body water and a portion of the base is supported on the dock.

2. The method of constructing and assembling a floating wind turbine platform according to claim 1, wherein the base includes a plurality of bottom beams extending radially from a keystone, wherein the center column is assembled on and mounted to the keystone, and wherein an outer column is assembled and mounted on a distal end of each bottom beam.

3. The method of constructing and assembling a floating wind turbine platform according to claim 2, further including post-tensioning each of the bottom beams to the keystone along the longitudinal axes of the bottom beams, and post-tensioning each of the center column and the outer columns along their longitudinal axes to the base.

4. The method of constructing and assembling a floating wind turbine platform according to claim 1, further including constructing the pre-stressed concrete base sections and the pre-stressed concrete column sections at multiple construction locations in the on-shore assembly area.

5. A method of constructing and assembling a floating wind turbine platform comprising:
   constructing pre-stressed reinforced concrete keystones, pre-stressed reinforced concrete beam sections, and pre-stressed reinforced concrete column base sections of a floating wind turbine platform base at multiple construction locations in an on-shore assembly area;
   assembling the beam sections and the column base sections to form a plurality of bottom beams at a first assembly location in the on-shore assembly area;
   assembling three bottom beams to a keystone at the first assembly location;
   post-tensioning each of the bottom beams to the keystone along the longitudinal axes of the bottom beams to define a base at the first assembly location;
   moving the base to a second assembly location in the on-shore assembly area;
   constructing pre-stressed reinforced concrete sections of floating wind turbine platform columns at multiple construction locations in the on-shore assembly area;
   assembling a plurality of the column sections onto the keystone to form a center column at the second assembly location;
   assembling a plurality of the column sections onto each column base section of the bottom beams to form outer columns at the second assembly location;
   post-tensioning each of the center column and the outer columns along their longitudinal axes to the base to define a hull at the second assembly location;
   moving the hull to a third assembly location in the on-shore assembly area;
   mounting secondary structures on and within the hull at the third assembly location;
   moving the hull to a fourth assembly location in the on-shore assembly area;
   constructing a wind turbine tower on the center column at the fourth assembly location;
   mounting a wind turbine on the wind turbine tower at the fourth assembly location, thus defining the floating wind turbine platform;
   moving the floating wind turbine platform to a launch platform in a fifth assembly location; and
   launching the floating wind turbine platform into a body of water.

6. The method of constructing and assembling a floating wind turbine platform according to claim 5, wherein the step of constructing a wind turbine tower on the center column includes constructing sections of the floating wind turbine platform tower and assembling the floating wind turbine platform tower sections on the center column to form the floating wind turbine platform tower.

7. The method of constructing and assembling a floating wind turbine platform according to claim 6, further including forming the floating wind turbine platform tower sections from one of fiber reinforced polymer and reinforced concrete.

8. The method of constructing and assembling a floating wind turbine platform according to claim 5, wherein the base is constructed on a platform configured to move on a system of rails in the floating wind turbine assembly area.

9. The method of constructing and assembling a floating wind turbine platform according to claim 8, wherein the rails extend between the first, second, third, fourth, and fifth assembly locations.

10. The method of constructing and assembling a floating wind turbine platform according to claim 5, further including a jack and slide system upon which the base, the hull, and the floating wind turbine platform are moved between the first and the fifth assembly locations.

11. The method of constructing and assembling a floating wind turbine platform according to claim 5, further including one of a system of heavy lifting airbags and a self-propelled modular transport (SPMT) system upon which the base, the hull, and the floating wind turbine platform are moved between the first and the fifth assembly locations.

12. The method of constructing and assembling a floating wind turbine platform according to claim 9, wherein the fifth assembly location includes a dock having two finger piers extending therefrom into the body of water, and wherein the finger piers include a system of rails thereon, the method further including moving the floating wind turbine platform on the rails in the fifth assembly location onto the rails of the finger piers such that a portion of the base is supported on the finger piers above a surface of the body water and a portion of the base is supported on the dock.

13. The method of constructing and assembling a floating wind turbine platform according to claim 12, further including:
   moving a launch barge between the finger piers and underneath the floating wind turbine platform supported on the finger piers;
   removing ballast from the launch barge until the launch barge lifts the floating wind turbine platform off of the finger piers and the dock, thereby transferring the floating wind turbine platform onto the launch barge;
   towing the launch barge to a launch area in the body of water;
   lowering one end of the launch barge; and
   sliding the floating wind turbine platform off of the launch barge into the body of water.

14. The method of constructing and assembling a floating wind turbine platform according to claim 13, wherein a deck of the launch barge includes a system of launch rails thereon, and wherein a pivot platform is mounted to the deck of the launch barge and configured to pivot relative to the deck of the launch barge, the method further including:
   sliding the floating wind turbine platform on the launch rails toward the body water and over the pivot platform such that when a center of gravity of the floating wind turbine platform is moved past a center of the pivot platform, the pivot platform will pivot relative to the deck of the launch dock to assist movement of the floating wind turbine platform along the launch rails, off of the deck, and into the body of water.

15. The method of constructing and assembling a floating wind turbine platform according to claim 13, wherein the fifth assembly location includes a dock having a slip formed therein, the method further including:
   moving the floating wind turbine platform on the rails in the fifth assembly location to a position over the slip;

moving a launch barge into the slip and underneath the floating wind turbine platform;
removing ballast from the launch barge until the launch barge lifts the floating wind turbine platform off of the dock, thereby transferring the floating wind turbine platform onto the launch barge;
towing the launch barge to a launch area in the body of water;
lowering one end of the launch barge; and
sliding the floating wind turbine platform off of the launch barge into the body of water.

16. The method of constructing and assembling a floating wind turbine platform according to claim 15, wherein a deck of the launch barge includes a system of launch rails thereon, and wherein a pivot platform is mounted to the deck of the launch barge and configured to pivot relative to the deck of the launch barge, the method further including:
sliding the floating wind turbine platform on the launch rails toward the body water and over the pivot platform such that when a center of gravity of the floating wind turbine platform is moved past a center of the pivot platform, the pivot platform will pivot relative to the deck of the launch dock to assist movement of the floating wind turbine platform along the launch rails, off of the deck, and into the body of water.

17. The method of constructing and assembling a floating wind turbine platform according to claim 9, wherein the fifth assembly location includes a dock having two finger piers extending therefrom into the body of water, and wherein the finger piers include a system of rails thereon, the method further including:
moving the floating wind turbine platform on the rails in the fifth assembly location onto the rails of the finger piers such that a portion of the base is supported on the finger piers above a surface of the body water and a portion of the base is supported on the dock;
moving a semi-submersible launch barge between the finger piers and underneath the floating wind turbine platform supported on the finger piers, the semi-submersible launch barge having a plurality of buoyant stability columns extending outwardly from a deck of the semi-submersible launch barge;
removing ballast from the semi-submersible launch barge until the launch barge lifts the floating wind turbine platform off of the finger piers and the dock, thereby transferring the floating wind turbine platform onto the semi-submersible launch barge;
towing the semi-submersible launch barge to a launch area in the body of water;
submerging the semi-submersible launch barge below the surface of the water until the floating wind turbine tower floats freely; and
moving the floating wind turbine platform away from the semi-submersible launch barge.

18. The method of constructing and assembling a floating wind turbine platform according to claim 9, wherein the fifth assembly location includes a dock having launch dock extending therefrom into the body of water, wherein a first end of the launch dock is pivotally attached to the dock and a second end of the launch dock extends away from the dock and into the body of water, and wherein the launch dock includes a system of launch rails thereon, the method further including moving the floating wind turbine platform on the rails in the fifth assembly location onto the launch rails of the launch dock until the floating wind turbine platform is fully supported on the launch dock; the method further including:
lowering the second end of the launch dock into the body of water; and
sliding the floating wind turbine platform on the launch rails into the body water.

19. The method of constructing and assembling a floating wind turbine platform according to claim 18, wherein a deck of the launch dock includes a pivot platform mounted thereto and configured to pivot relative to the deck of the launch dock, the method further including:
sliding the floating wind turbine platform on the launch rails toward the body water and over the pivot platform such that when a center of gravity of the floating wind turbine platform is moved past a center of the pivot platform, the pivot platform will pivot relative to the deck of the launch dock to assist movement of the floating wind turbine platform along the launch rails, off of the deck, and into the body of water.

20. A method of constructing and assembling a floating wind turbine platform comprising:
constructing pre-stressed concrete sections of a floating wind turbine platform base;
assembling the floating wind turbine platform base sections to form the base at a first assembly location in a floating wind turbine platform assembly area;
moving the base to a second assembly location in the floating wind turbine platform assembly area;
constructing pre-stressed concrete sections of floating wind turbine platform columns;
assembling the column sections to form a center column and a plurality of outer columns on the base to define a hull at the second assembly location in the floating wind turbine platform assembly area;
moving the hull to a third assembly location in the floating wind turbine platform assembly area;
mounting secondary structures on and within the hull;
moving the hull to a fourth assembly location in the floating wind turbine platform assembly area;
constructing a wind turbine tower on the center column;
mounting a wind turbine on the wind turbine tower, thus defining the floating wind turbine platform;
moving the floating wind turbine platform to a launch platform in a fifth assembly location; and
launching the floating wind turbine platform into a body of water;
wherein the base is assembled on a platform configured to move on a system of rails;
wherein the rails extend between the first, second, third, fourth, and fifth assembly locations;
wherein the fifth assembly location includes a dock having two finger piers extending therefrom into the body of water; and
wherein the finger piers include a system of rails thereon, the method further including:
moving the floating wind turbine platform on the rails in the fifth assembly location onto the rails of the finger piers such that a portion of the base is supported on the finger piers above a surface of the body water and a portion of the base is supported on the dock;
moving a semi-submersible launch barge between the finger piers and underneath the floating wind turbine platform supported on the finger piers, the semi-submersible launch barge having a plurality of buoyant stability columns extending outwardly from a deck of the semi-submersible launch barge;
removing ballast from the semi-submersible launch barge until the launch barge lifts the floating wind turbine platform off of the finger piers and the dock, thereby transferring the floating wind turbine platform onto the semi-submersible launch barge;

towing the semi-submersible launch barge to a launch area in the body of water;

submerging the semi-submersible launch barge below the surface of the water until the floating wind turbine tower floats freely; and moving the floating wind turbine platform away from the semi-submersible launch barge.

21. A method of constructing and assembling a floating wind turbine platform comprising:

constructing pre-stressed concrete sections of a floating wind turbine platform base;

assembling the floating wind turbine platform base sections to form the base at a first assembly location in a floating wind turbine platform assembly area;

moving the base to a second assembly location in the floating wind turbine platform assembly area;

constructing pre-stressed concrete sections of floating wind turbine platform columns;

assembling the column sections to form a center column and a plurality of outer columns on the base to define a hull at the second assembly location in the floating wind turbine platform assembly area;

moving the hull to a third assembly location in the floating wind turbine platform assembly area;

mounting secondary structures on and within the hull;

moving the hull to a fourth assembly location in the floating wind turbine platform assembly area;

constructing a wind turbine tower on the center column;

mounting a wind turbine on the wind turbine tower, thus defining the floating wind turbine platform;

moving the floating wind turbine platform to a launch platform in a fifth assembly location; and launching the floating wind turbine platform into a body of water;

wherein the base is assembled on a platform configured to move on a system of rails;

wherein the rails extend between the first, second, third, fourth, and fifth assembly locations;

wherein the fifth assembly location includes a dock having launch dock extending therefrom into the body of water;

wherein a first end of the launch dock is pivotally attached to the dock and a second end of the launch dock extends away from the dock and into the body of water; and wherein the launch dock includes a system of launch rails thereon, the method further including:

moving the floating wind turbine platform on the rails in the fifth assembly location onto the launch rails of the launch dock until the floating wind turbine platform is fully supported on the launch dock;

lowering the second end of the launch dock into the body of water; and sliding the floating wind turbine platform on the launch rails into the body water.

22. The method of constructing and assembling a floating wind turbine platform according to claim 5, wherein the step of mounting secondary structures on and within the hull includes mounting one or more of a top beam, a catwalk, a tower access platform, a ladder, hull mechanical systems, and hull electrical systems on and within the hull.

* * * * *